US012732585B2

(12) United States Patent
Sasaki

(10) Patent No.: US 12,732,585 B2
(45) Date of Patent: Sep. 8, 2026

(54) COLOR MATCHING CONTROL APPARATUS, CONTROL METHOD THEREFOR, AND STORAGE MEDIUM STORING CONTROL PROGRAM THEREFOR THAT EXTRACT PIXEL VALUES TO GENERATE A COLOR MATCHING PARAMETER

(71) Applicant: CANON KABUSHIKI KAISHA, Tokyo (JP)

(72) Inventor: Masatsugu Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 18/608,819

(22) Filed: Mar. 18, 2024

(65) Prior Publication Data

US 2024/0333863 A1 Oct. 3, 2024

(30) Foreign Application Priority Data

Mar. 28, 2023 (JP) ................................ 2023-051644

(51) Int. Cl.

| | |
|---|---|
| ***H04N 1/60*** | (2006.01) |
| ***G06T 5/50*** | (2006.01) |
| ***G06T 5/92*** | (2024.01) |
| ***G06T 7/11*** | (2017.01) |
| ***G06V 10/56*** | (2022.01) |

(52) U.S. Cl.

CPC ............ *H04N 1/6019* (2013.01); *G06T 5/50* (2013.01); *G06T 5/92* (2024.01); *G06T 7/11* (2017.01); *G06V 10/56* (2022.01); *G06T 2207/10024* (2013.01); *G06T 2207/20221* (2013.01)

(58) Field of Classification Search

CPC ........ H04N 1/6019; G06V 10/56; G06T 7/11; G06T 5/92; G06T 5/50; G06T 2207/10024; G06T 2/07; G06T 2/20221

See application file for complete search history.

(56) References Cited

U.S. PATENT DOCUMENTS

| | | | | |
|---|---|---|---|---|
| 10,186,301 | B1 * | 1/2019 | van Hoff | H04N 13/271 |
| 2006/0001892 | A1 * | 1/2006 | Bai | G06T 11/10 358/1.9 |
| 2009/0185199 | A1 | 7/2009 | Fan et al. | 358/1.1 |

(Continued)

FOREIGN PATENT DOCUMENTS

| | | |
|---|---|---|
| JP | 2009-175281 | 8/2009 |

*Primary Examiner* — David Perlman
(74) *Attorney, Agent, or Firm* — Venable LLP

(57) ABSTRACT

A color matching control apparatus obtains a second image picked up by a second image pickup apparatus to include a color chart area, extracts pixel values of the color chart area included in a first image as first values, extracts pixel values of the color chart area in the second image as second values, calculates a dynamic range of the color chart area in the first image based on the first pixel values, sets a predetermined pixel in an area excluding the color chart area in the first image as at least one first singular point based on the dynamic range, extracts a pixel value of the at least one first singular point, sets at least one second singular point in the second image based on the at least one first point, extracts a pixel value of the at least one second singular point, and generates a color matching parameter.

18 Claims, 18 Drawing Sheets

(56) References Cited

U.S. PATENT DOCUMENTS

| | | | | |
|---|---|---|---|---|
| 2011/0075923 | A1* | 3/2011 | Imai | H04N 1/6033 382/167 |
| 2013/0322750 | A1* | 12/2013 | Agarwal | G01J 3/462 382/165 |
| 2022/0156899 | A1* | 5/2022 | Abdelhamed | H04N 23/85 |

* cited by examiner

1
COLOR MATCHING CONTROL APPARATUS
200
DISPLAY VIDEO FROM REFERENCE CAMERA 100
DISPLAY VIDEO FROM TARGET CAMERA 101
IMAGE PICKUP APPARATUSES
100
REFERENCE CAMERA
101
TARGET CAMERA
30
COLOR CHART
OBJECTS

*FIG. 4A*

COLOR CHART IN REFERENCE IMAGE

| PATCH NUMBER | R | G | B |
|---|---|---|---|
| 31 | 57 | 41 | 34 |
| 32 | 97 | 75 | 65 |
| 33 | 49 | 61 | 78 |
| 34 | 43 | 54 | 33 |
| 35 | 66 | 64 | 88 |
| 36 | 51 | 94 | 85 |
| 37 | 107 | 63 | 22 |
| 38 | 40 | 45 | 83 |
| 39 | 96 | 45 | 49 |
| 40 | 47 | 30 | 54 |
| 41 | 78 | 94 | 32 |
| 42 | 112 | 81 | 23 |
| 43 | 28 | 30 | 75 |
| 44 | 35 | 74 | 36 |
| 45 | 87 | 27 | 30 |
| 46 | 115 | 99 | 15 |
| 47 | 93 | 43 | 74 |
| 48 | 4 | 66 | 80 |
| 49 | 144 | 144 | 144 |
| 50 | 128 | 128 | 128 |
| 51 | 96 | 96 | 96 |
| 52 | 64 | 64 | 64 |
| 53 | 32 | 32 | 32 |
| 54 | 16 | 16 | 16 |

*FIG. 4B*

COLOR CHART IN TARGET IMAGE

| PATCH NUMBER | R | G | B |
|---|---|---|---|
| 31 | 63 | 43 | 32 |
| 32 | 107 | 78 | 61 |
| 33 | 54 | 64 | 74 |
| 34 | 48 | 56 | 31 |
| 35 | 73 | 67 | 84 |
| 36 | 57 | 99 | 80 |
| 37 | 118 | 66 | 20 |
| 38 | 44 | 47 | 79 |
| 39 | 107 | 47 | 47 |
| 40 | 52 | 31 | 51 |
| 41 | 87 | 98 | 30 |
| 42 | 124 | 85 | 21 |
| 43 | 31 | 32 | 71 |
| 44 | 38 | 77 | 34 |
| 45 | 97 | 28 | 28 |
| 46 | 128 | 104 | 14 |
| 47 | 103 | 45 | 70 |
| 48 | 4 | 70 | 76 |
| 49 | 160 | 160 | 160 |
| 50 | 144 | 144 | 144 |
| 51 | 127 | 127 | 127 |
| 52 | 111 | 111 | 111 |
| 53 | 50 | 50 | 50 |
| 54 | 16 | 16 | 16 |

FIG. 5

| LATTICE POINT NUMBER | | | INPUT | | | OUTPUT (REFERENCE) | | | OUTPUT (TARGET) | | |
|---|---|---|---|---|---|---|---|---|---|---|---|
| R | G | B | R | G | B | R | G | B | R | G | B |
| 0 | 0 | 0 | 0 | 0 | 0 | $Rr_0$ | $Gr_0$ | $Br_0$ | $Rt_0$ | $Gt_0$ | $Bt_0$ |
| : | : | : | : | : | : | $Rr_1$ | $Gr_1$ | $Br_1$ | $Rt_1$ | $Gt_1$ | $Bt_1$ |
| : | 0 | 16 | : | 0 | 255 | $Rr_2$ | $Gr_2$ | $Br_2$ | $Rt_2$ | $Gt_2$ | $Bt_2$ |
| : | 1 | 0 | : | 16 | 0 | : | : | : | : | : | : |
| : | : | : | : | : | : | : | : | : | : | : | : |
| : | 1 | 16 | : | 16 | 255 | : | : | : | : | : | : |
| : | : | : | : | : | : | : | : | : | : | : | : |
| : | 16 | 0 | : | 255 | 0 | : | : | : | : | : | : |
| : | : | : | : | : | : | $Rr_{4911}$ | $Gr_{4911}$ | $Br_{4911}$ | $Rt_{4911}$ | $Gt_{4911}$ | $Bt_{4911}$ |
| 16 | 16 | 16 | 255 | 255 | 255 | $Rr_{4912}$ | $Gr_{4912}$ | $Br_{4912}$ | $Rt_{4912}$ | $Gt_{4912}$ | $Bt_{4912}$ |

FIG. 6

| LATTICE POINT NUMBER | | | THREE DIMENSIONAL LUT | | |
|---|---|---|---|---|---|
| R | G | B | R | G | B |
| 0 | 0 | 0 | $Rr_0$-$Rt_0$ | $Gr_0$-$Gt_0$ | $Br_0$-$Bt_0$ |
| : | : | : | $Rr_1$-$Rt_1$ | $Gr_1$-$Gt_1$ | $Br_1$-$Bt_1$ |
| : | 0 | 16 | $Rr_2$-$Rt_2$ | $Gr_2$-$Gt_2$ | $Br_2$-$Bt_2$ |
| : | 1 | 0 | : | : | : |
| : | : | : | : | : | : |
| : | 1 | 16 | : | : | : |
| : | : | : | : | : | : |
| : | 16 | 0 | : | : | : |
| : | : | : | $Rr_{4911}$-$Rt_{4911}$ | $Gr_{4911}$-$Gt_{4911}$ | $Br_{4911}$-$Bt_{4911}$ |
| 16 | 16 | 16 | $Rr_{4912}$-$Rt_{4912}$ | $Gr_{4912}$-$Gt_{4912}$ | $Br_{4912}$-$Bt_{4912}$ |

Figure 12:
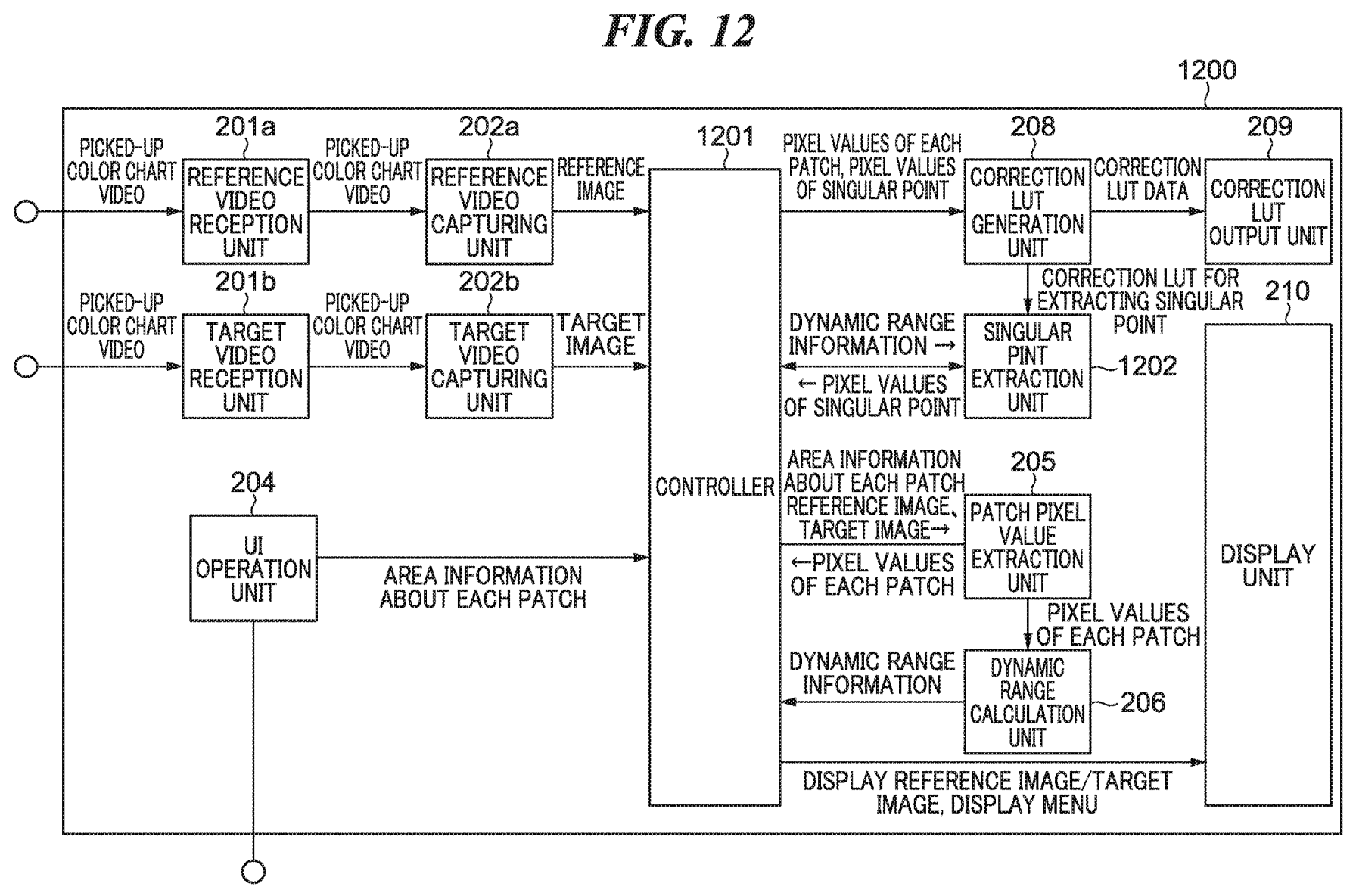

201a REFERENCE VIDEO RECEPTION UNIT
202a REFERENCE VIDEO CAPTURING UNIT
201b TARGET VIDEO RECEPTION UNIT
202b TARGET VIDEO CAPTURING UNIT
204 UI OPERATION UNIT
1201 CONTROLLER
208 CORRECTION LUT GENERATION UNIT
209 CORRECTION LUT OUTPUT UNIT
1202 SINGULAR PINT EXTRACTION UNIT
205 PATCH PIXEL VALUE EXTRACTION UNIT
206 DYNAMIC RANGE CALCULATION UNIT
210 DISPLAY UNIT

PICKED-UP COLOR CHART VIDEO
REFERENCE IMAGE
TARGET IMAGE
AREA INFORMATION ABOUT EACH PATCH
PIXEL VALUES OF EACH PATCH, PIXEL VALUES OF SINGULAR POINT
CORRECTION LUT DATA
CORRECTION LUT FOR EXTRACTING SINGULAR POINT
DYNAMIC RANGE INFORMATION →
← PIXEL VALUES OF SINGULAR POINT
AREA INFORMATION ABOUT EACH PATCH REFERENCE IMAGE, TARGET IMAGE→
←PIXEL VALUES OF EACH PATCH
PIXEL VALUES OF EACH PATCH
DYNAMIC RANGE INFORMATION
DISPLAY REFERENCE IMAGE/TARGET IMAGE, DISPLAY MENU

FIG. 17

COLOR MATCHING CONTROL APPARATUS, CONTROL METHOD THEREFOR, AND STORAGE MEDIUM STORING CONTROL PROGRAM THEREFOR THAT EXTRACT PIXEL VALUES TO GENERATE A COLOR MATCHING PARAMETER

CROSS REFERENCE TO PRIORITY APPLICATION

This application claims the benefit of Japanese Patent Application No. 2023-051644, filed Mar. 28, 2023, which is hereby incorporated by reference herein in its entirety.

BACKGROUND OF THE INVENTION

Field of the Invention

The present invention relates to a color matching control apparatus, a control method therefor, and a storage medium storing a control program therefor.

Description of the Related Art

In a photographing site, for example, when a fashion model or a sample of a product is photographed, a plurality of cameras may be used for photographing. In such a photographing site, color matching between images photographed by the cameras is performed prior to the photographing. In this description, among the plurality of cameras, a camera serving as a reference for the color matching is referred to as a "reference camera" and a camera serving as a target for the color matching is referred to as a "target camera".

In the color matching, first, a color chart is arranged in a photographing environment, and a reference camera and a target camera are arranged side by side in front of the color chart. In this arrangement, the reference camera and the target camera pick up images of the color chart. Then, parameters for matching chromaticity and luminance obtained by the target camera with chromaticity and luminance obtained by the reference camera are generated on the basis of these images. These parameters can then be applied to the target camera to achieve the color matching. The parameters are generated as, for example, a table (hereinafter referred to as a "correction LUT (Look Up Table)").

When a correction LUT is generated using a color chart, a dynamic range of the color chart may be relatively reduced, that is, may be narrower than a dynamic range of the camera, depending on the illumination environment of the photographing site or a setting state of a camera, for example. Then, when a correction LUT is generated in a state where the dynamic range of the color chart is reduced and the color matching is performed on the basis of the correction LUT, color curving occurs in a color space outside the dynamic range of the color chart because the color matching in a high luminance gradation becomes inaccurate, for example.

For example, Japanese Patent Laid-Open Publication No. 2009-175281 (Counterpart of U.S. 2009/0185199 A1) discloses a technique that performs color matching by adding an important color that is designated in an image by a user in order to improve the color matching accuracy of a color that is not included in a color chart. This improves the color matching accuracy for the color added as the important color.

However, if the important color is included in the dynamic range of the color chart, the color curving occurs in the color space outside the dynamic range of the color chart and image quality deteriorates.

SUMMARY OF THE INVENTION

The present invention provides a color matching control apparatus, a control method therefor, and a storage medium storing a control program therefor, which are capable of accurately matching colors of images picked up by respective image pickup apparatuses even in a color space outside a dynamic range of a color chart.

Accordingly, an aspect of the present invention provides a color matching control apparatus including a memory device that stores a set of instructions, and at least one processor that executes the set of instructions to obtain a first image picked up by a first image pickup apparatus so as to include a color chart area, to obtain a second image picked up by a second image pickup apparatus so as to include a color chart area, to extract pixel values of the color chart area included in the first image as first pixel values, to extract pixel values of the color chart area included in the second image as second pixel values, to calculate a dynamic range of the color chart area included in the first image based on the first pixel values, to set at least one predetermined pixel in an area excluding the color chart area in the first image as at least one first singular point based on the dynamic range, to extract a pixel value of the at least one first singular point, to set at least one second singular point in the second image based on the at least one first singular point, to extract a pixel value of the at least one second singular point, and to generate a parameter for color matching between images picked up by the first and second image pickup apparatuses based on the first pixel values, the second pixel values, the pixel value of the at least one first singular point, and the pixel value of the at least one second singular point.

According to the present invention, even in the color space outside the dynamic range of the color chart, the color matching between images picked up by the respective image pickup apparatuses can be accurately performed.

Further features of the present invention will become apparent from the following description of exemplary embodiments with reference to the attached drawings.

BRIEF DESCRIPTION OF THE DRAWINGS

FIG. 4A and FIG. 4B are tables showing examples of second pixel values (pixel values of patches in a second image) and examples of first pixel values (pixel values of the patches in a first image), respectively.

FIG. 5 is a table showing input data and output data of an approximation formula.

FIG. 6 is a view showing a three dimensional LUT as a correction LUT.

FIG. 12 is a block diagram showing a hardware configuration of a color matching control apparatus according to a second embodiment.

FIG. 17 is a view showing an example of a setting menu screen for setting a singular point in the second embodiment.

DESCRIPTION OF THE EMBODIMENTS

Figure 1:
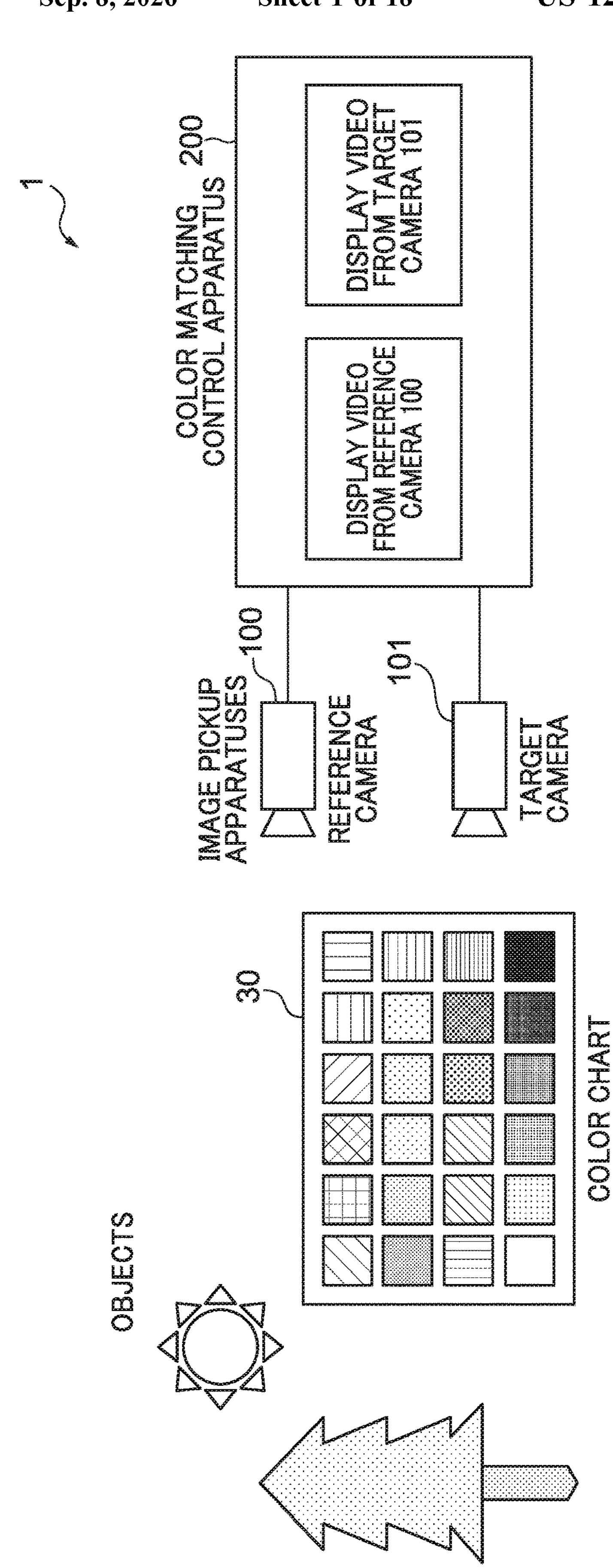
FIG. 1 is a view showing a configuration of a color matching system including a color matching control apparatus according to a first embodiment.

Hereinafter, embodiments according to the present invention will be described in detail by referring to the drawings. However, the configurations described in the following embodiments are merely examples, and the scope of the present invention is not limited by the configurations described in the embodiments. For example, each unit constituting the present invention can be replaced with any configuration capable of exhibiting the same function. In addition, an arbitrary constituent may be added. Any two or more configurations (features) of the embodiments can be combined.

Hereafter, a first embodiment will be described with reference to FIG. 1 to FIG. 11. FIG. 1 is a view showing a configuration of a color matching system including a color matching control apparatus according to a first embodiment. The system 1 shown in FIG. 1 includes two image pickup apparatuses 100 and 101 and a color matching control apparatus 200 communicably connected to the image pickup apparatuses 100 and 101. The image pickup apparatuses 100 and 101 and the color matching control apparatus 200 are connected to each other by wire or wirelessly.

The color matching control apparatus 200 performs color matching between images picked up by the image pickup apparatuses 100 and 101. The "color matching" means that at least chromaticity and luminance are matched. The image pickup apparatus 100 among the two image pickup apparatuses 100 and 101 is a reference camera that picks up a reference image to be subjected to a reference for the color matching. The other (remaining) image pickup apparatus 101 is a target camera that picks up a target image to be subjected to a target for the color matching.

Each of the reference image and the target image includes an area of a color chart 30 used for the color matching. The reference image and the target image are then sent to the color matching control apparatus 200. The color matching control apparatus 200 generates a correction LUT (Look Up Table) for color matching on the basis of the reference image and the target image. The color matching between the image pickup apparatuses 100 and 101 can be made by applying the correction LUT to the target camera 101.

In this embodiment, the target camera 101 is set as a first image pickup apparatus, and the reference camera 100 is set as a second image pickup apparatus, for example. In this case, the target image, including the area of the color chart 30 picked up by the target camera 101 as the first image pickup apparatus, is set as a first image. The reference image including the area of the color chart 30 picked up by the reference camera 100 as the second image pickup apparatus is set as a second image.

The embodiment is not limited to the above configuration in which the target camera 101 is set as the first image pickup apparatus and the reference camera 100 is set as the second image pickup apparatus. That is, the reference camera 100 may be set as the first image pickup apparatus and the target camera 101 may be set as the second image pickup apparatus. In this case, the reference image captured by the reference camera 100 as the first image pickup apparatus is referred to as the first image, and the target image captured by the target camera 101 as the second image pickup apparatus is referred to as the second image.

The method of transmitting the reference image and the target image to the color matching control apparatus 200 is not limited to the wired connection or the wireless connection described above. For example, the images may be stored in recording media, such as memory cards, and transmitted to the color matching control apparatus 200 via the recording media.

The number of image pickup devices arranged in the system 1 is not limited to two, and may be three or more, for example. For example, when three image pickup apparatuses are arranged, one of the image pickup apparatuses is set as the reference camera 100, and the remaining two image pickup apparatuses are set as the target cameras 101. In this case, the color matching between the reference camera 100 and one target camera 101 of the two target cameras 101 is made, and the color matching between the reference camera 100 and the other target camera 101 is made.

Figure 2:
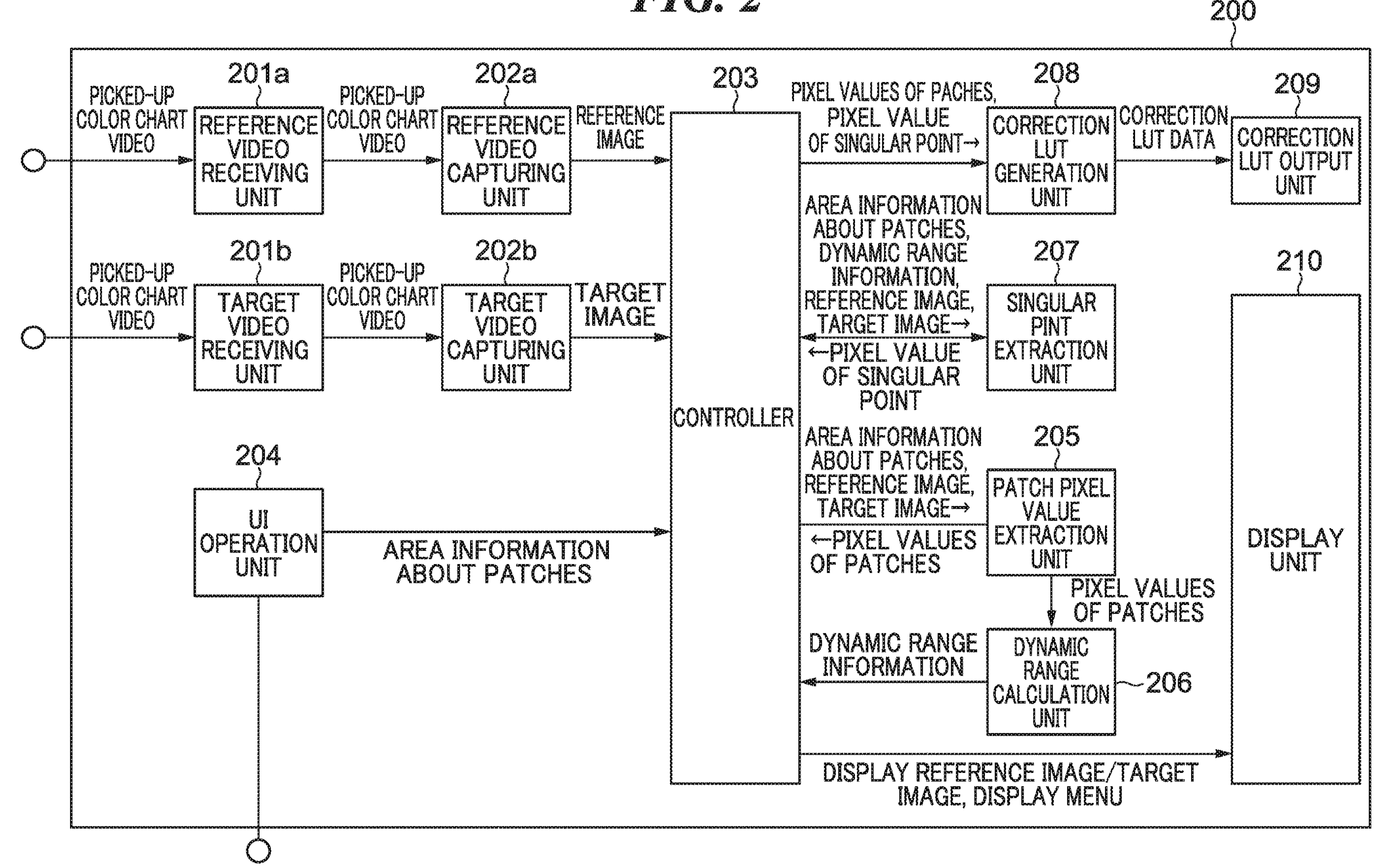
FIG. 2 is a block diagram showing a hardware configuration of the color matching control apparatus.

FIG. 2 is a block diagram showing a hardware configuration of the color matching control apparatus. As shown in FIG. 2, the color matching control apparatus 200 includes a reference video receiving unit (an obtaining unit) 201*a*, a target video receiving unit (an obtaining unit) 201*b*, a reference video capturing unit 202*a*, a target video capturing unit 202*b*, a controller 203, and a (UI) user interface operation unit 204. The color matching control apparatus 200 includes a patch pixel value extraction unit (a first extraction unit) 205, a dynamic range calculation unit (a calculation unit) 206, and a singular point extraction unit (a second extraction unit) 207. The color matching control apparatus 200 further includes a correction LUT generation unit (a generation unit) 208, a correction LUT output unit 209, and a display unit 210.

The reference video receiving unit 201*a* receives, that is, obtains the reference video picked up by the reference camera 100 (an obtaining step). Thereafter, the reference video receiving unit 201*a* transmits the video received from the reference camera 100 to the reference video capturing unit 202*a*. The target video receiving unit 201*b* receives, that is, obtains the target video captured by the target camera 101 (an obtaining step). Thereafter, the target image receiving unit 201*b* transmits the video received from the target camera 101 to the target image capturing unit 202*b*.

The reference video capturing unit 202*a* generates an image obtained by capturing a video from the reference camera 100 and transmits the image to the controller 203. The target video capturing unit 202*b* generates an image obtained by capturing the video from the target camera 101 and transmits the image to the controller 203. Each capturing unit can capture an image by saving one frame of the video in a frame memory and outputting the image, for example. The image obtained by capturing the video image from the reference camera 100 serves as a reference image, and the image obtained by capturing the video image from the target camera 101 serves as a target image.

The controller 203 is a computer that controls the entire color matching control apparatus 200. The color matching control apparatus 200 stores in advance a program for causing the controller 203 to execute each unit or each step (a control method for the color matching control apparatus) of the color matching control apparatus 200. The controller 203 receives the reference image from the reference image capturing unit 202*a* and the target image from the target image capturing unit 202*b*.

The controller 203 receives area information about patches in the color chart 30 in each image through the UI operation unit 204. The area information about the patches will be described later. The controller 203 transmits the reference image, the target image, and the area information about the patches to the patch pixel value extraction unit 205, and receives a pixel value (an RGB value) of each patch extracted by the patch pixel value extraction unit 205.

The controller 203 receives information about a dynamic range of the area of the color chart 30 calculated by a dynamic range calculation unit 206. The controller 203 transmits the reference image, the target image, the area information about the patches, and the dynamic range information to the singular point extraction unit 207, and receives the pixel value of the singular point calculated by the singular point extraction unit 207.

The controller 203 transmits the pixel values (the pixel values of the patches and the pixel values of the singular points) in the reference image and the target image for generating a correction LUT to the correction LUT generation unit 208. The controller 203 generates a display screen in which the reference image and the target image are arranged, a display screen in which the area information about each patch is superimposed on the reference image and the target image as a rectangle, or the like, and transmits the display screen to the display unit 210.

The UI operation unit 204 receives an operation from a user and transmits the operation result to the controller 203.

Figure 3:
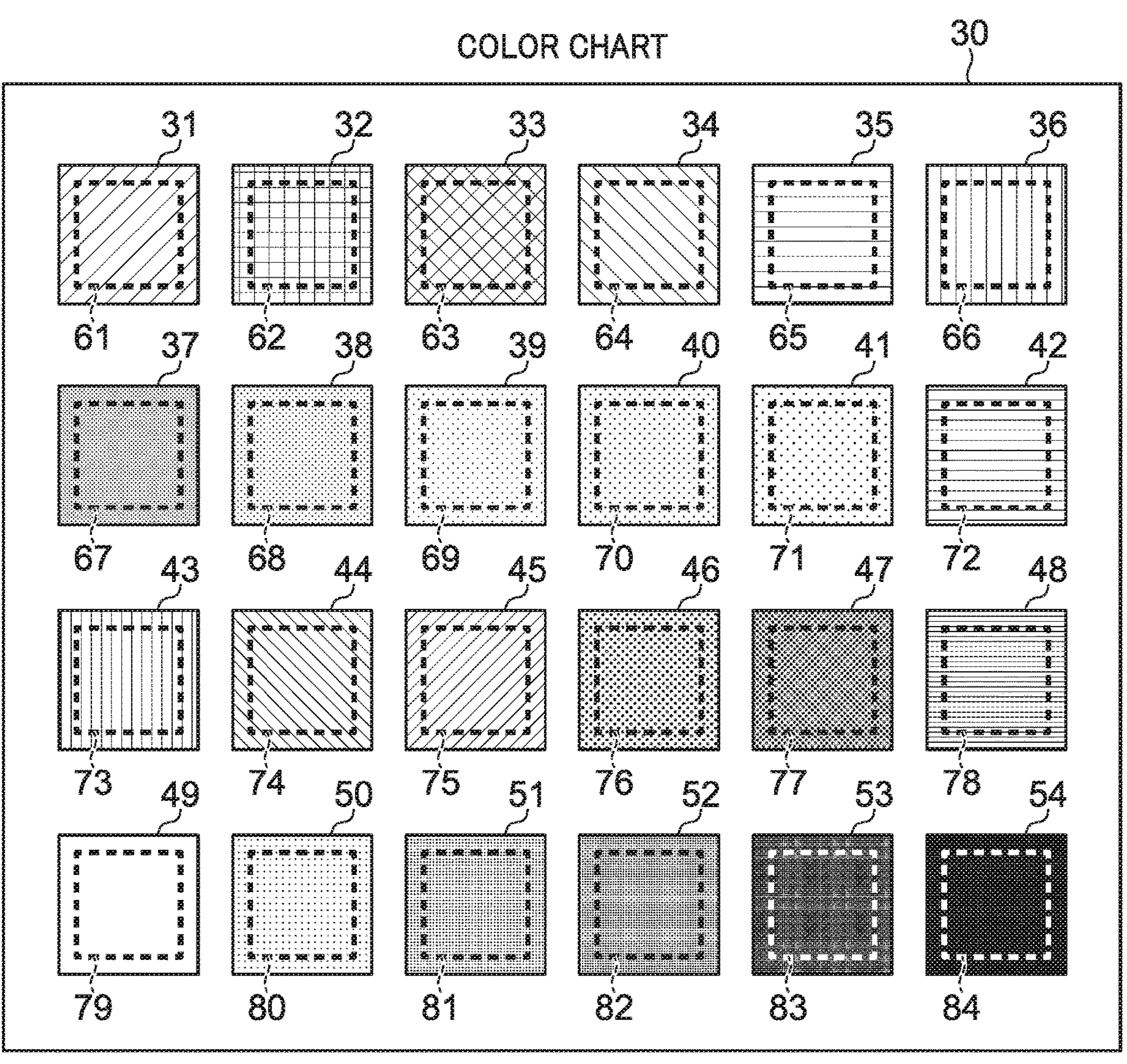
FIG. 3 is a view showing an example of an image of a color chart picked up by an image pickup apparatus.

FIG. 3 is a view showing an example of an image of a color chart picked up by an image pickup apparatus. As shown in FIG. 3, the color chart 30 includes patches 31 to 54 that are arranged in a matrix of six rows and four columns, have color portions adjacent to each other and having different colors, and are cut out (divided) for each color portion. The user can select insides of the patches 31 to 54 with rectangles 61 to 84, respectively, using an operation device such as a mouse. For example, the user can select the inside of the patch 31 with the rectangle 61 and can select the inside of the patch 54 with the rectangle 84. The rectangles 61 to 84 preferably have the same shape and size, but this is not limiting. The UI operation unit 204 transmits coordinates of start points and end points of the rectangles 61 to 84 to the controller 203 as the area information about the patches 31 to 54.

The patch pixel value extraction unit 205 receives the reference image, the target image, the area information about the patches 31 to 54 in the reference image, and the area information about the patches 31 to 54 in the target image from the controller 203. Then, the patch pixel value extraction unit 205 extracts the pixel values of the patches 31 to 54 as first pixel values based on the target image and the area information about the patches 31 to 54 in the target image (a first extraction step). The first pixel values are pixel values of the color chart area included in the target image (the first image).

Similarly, the patch pixel value extraction unit 205 extracts the pixel values of the patches 31 to 54 as second pixel values based on the reference image and the area information about the patches 31 to 54 in the reference image (the first extraction step). The second pixel values are pixel values of the color chart area included in the reference image (the second image). The patch pixel value extraction unit 205 transmits the first pixel values and second pixel values to the controller 203 and the dynamic range calculation unit 206.

FIG. 4A and FIG. 4B are tables showing examples of second pixel values (pixel values of patches in a second image) and examples of first pixel values (pixel values of the patches in a first image), respectively. An R component of each patch number in FIG. 4A and FIG. 4B may be, for example, a mean value of the R components of all the pixels in each patch or a median value of the R components of all the pixels in each patch. The same applies to a G component and a B component.

The dynamic range calculation unit 206 receives the first pixel values and the second pixel values from the patch pixel value extraction unit 205. Then, the dynamic range calculation unit 206 calculates the dynamic range in the area of the color chart 30 included in the first image as a first dynamic range based on the first pixel values (a calculation step). The calculation method is not particularly limited. For example, a range from the minimum value to the maximum value of the first pixel values is set as the first dynamic range. Here, "a dynamic range in a color chart area" is different from a dynamic range of the target camera 101, and is a dynamic range of the color chart 30 captured (obtained) by the target camera 101. The dynamic range calculation unit 206 transmits the calculated first dynamic range to the controller 203.

The singular point extraction unit 207 receives the reference image, the target image, the area information about the patches 31 to 54 in the respective images, and the information about the first dynamic range from the controller 203. Then, the singular point extraction unit 207 sets a predetermined pixel outside the first dynamic range in the area excluding the color chart 30 in the target image (the first image) as a first singular point (a first constraint point).

The singular point extraction unit 207 extracts the pixel value of the first singular point as a first singular pixel value (a second extraction step). As a result, the first singular pixel value is a pixel value outside the first dynamic range. The singular point extraction unit 207 sets, for example, a point at which the pixel value is the maximum in the area excluding the color chart 30 in the target image (the first image) as a first singular point, and extracts the pixel value (the maximum pixel value) of the first singular point as the first singular pixel value. Instead of setting the point at which the pixel value is the maximum as the first singular point, a point at which the pixel value is the minimum may be set as the first singular point.

The singular point extraction unit 207 sets a second singular point (a second constraint point) in the reference image (the second image) based on the first singular point. The singular point extraction unit 207 extracts the pixel value of the second singular point as a second singular pixel value (the second extraction step). For example, the singular point extraction unit 207 sets a point having the same coordinate as the first singular point under a condition where the reference image and the target image are superimposed on a common coordinate system as a second singular point, and extracts a pixel value of the second singular point as a second singular pixel value.

The correction LUT generation unit 208 receives the first pixel values, the second pixel values, the first singular pixel value, and the second singular pixel value from the controller 203. Then, the correction LUT generation unit 208 generates a correction LUT as a color matching parameter on the basis of the first pixel values, the second pixel values, the first singular pixel value, and the second singular pixel value (a generation step). The correction LUT generation unit 208 transmits the correction LUT to the correction LUT output unit 209.

The correction LUT generation unit 208 generates the correction LUT by estimating pixel values of pixels other than the patches and the singular points by an approximation formula using the first pixel values, the second pixel values, the first singular pixel value, and the second singular pixel value (an RGB value), for example. For example, the approximation formula is obtained by determining coefficients $a_0, a_1, \ldots, a_{n-1}, a_n$ of a multidimensional function of the following formula (1) on the basis of average data of achromatic color patches included in the color chart 30. Note that x is an input value.

$$f(x) = a_0x^n + a_1x^{n-1} + \ldots + a_{n-1}x + a_n \quad (1)$$

When there are a plurality of R monochrome patches in the color chart 30, an approximation formula of a multidimensional function for the R component may be obtained as the multidimensional function. The same may apply to the G component and the B component. The approximation formula is not limited to the formula using a multidimensional function, and for example, linear approximation, Log approximation, or the like may be used. FIG. 5 is a table showing input data and output data of the approximation formula. For example, when the correction LUT is a three dimensional LUT having 17*17*17 grid points, the combined RGB data for the grid points is substituted for the input value x in the above formula (1). This results in a corresponding output value (f (x)).

FIG. 6 is a view showing a three dimensional LUT as a correction LUT. As shown in FIG. 6, the output value of the correction LUT generated by the correction LUT generation unit 208 is calculated by the difference between the output value of the approximation formula for the reference camera 100 and the output value of the approximation formula for the target camera 101.

The correction LUT output unit 209 receives the correction LUT generated by the correction LUT generation unit 208. Then, the correction LUT output unit 209 transmits the correction LUT in an import format to the target camera 101. As a result, the correction LUT is stored in the target camera 101, and the color matching can be performed. The import method is not particularly limited. For example, there is a method of temporarily copying the correction LUT to a portable medium, such as a USB stick and importing the correction LUT to the target camera 101 via the portable medium. In addition, for example, when the target camera 101 and the color matching control apparatus 200 are connected via a LAN, a method of importing the correction LUT into the target camera 101 via the LAN can be used.

The display unit 210 can display various screens, such as an operation menu received from the controller 203, videos picked up by the cameras 100 and 101.

Figure 7:
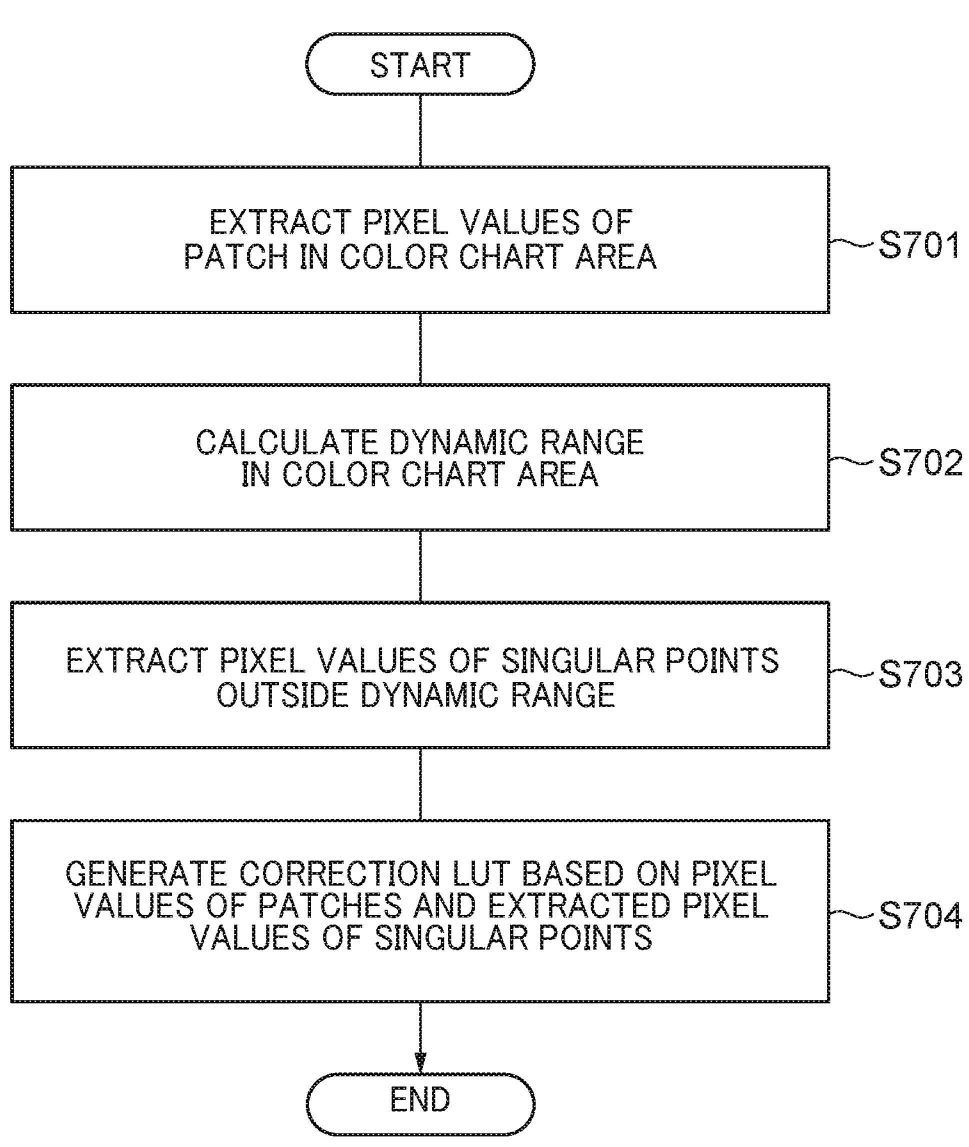
FIG. 7 is a flowchart showing a process for generating the correction LUT for color matching between a target camera and a reference camera in the color matching control apparatus according to the first embodiment.

FIG. 7 is a flowchart showing a process for generating the correction LUT for the color matching between the target camera and the reference camera. The program based on the flowchart shown in FIG. 7 is executed by the color matching control apparatus 200. The program is started when the controller 203 transmits a reference image 800*a* and a target image 800*b*, which will be described later, and area information about the patches to the patch pixel value extraction unit 205.

Figure 8A:
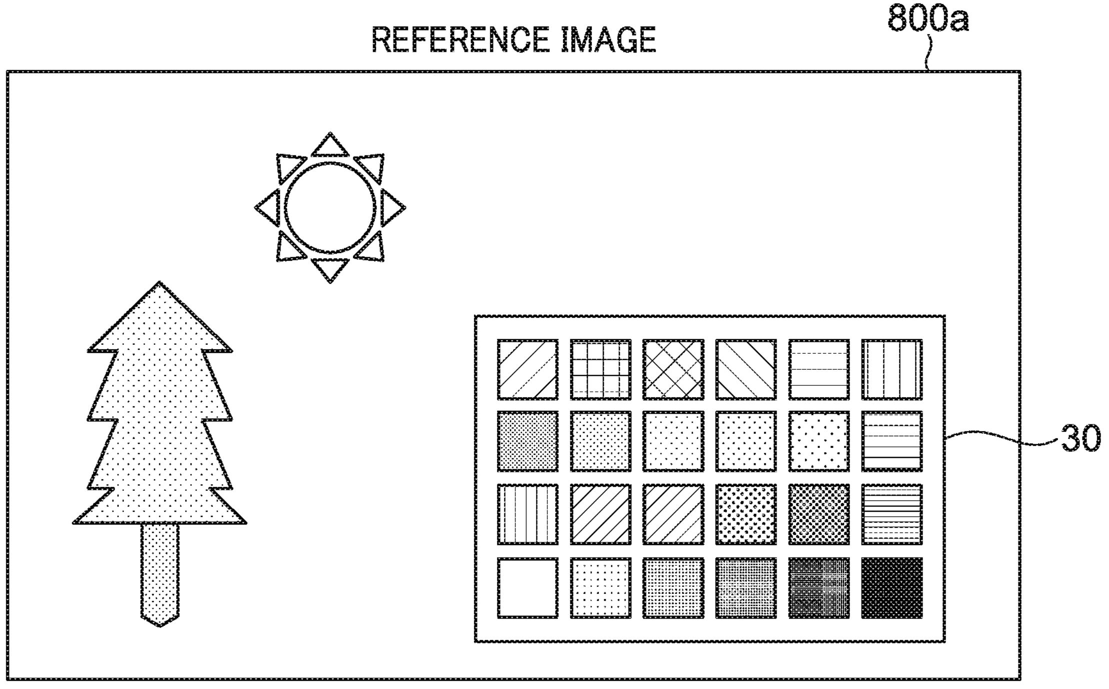
FIG. 8A and FIG. 8B are views respectively showing an example of a reference image and an example of a target image.
Figure 8B:
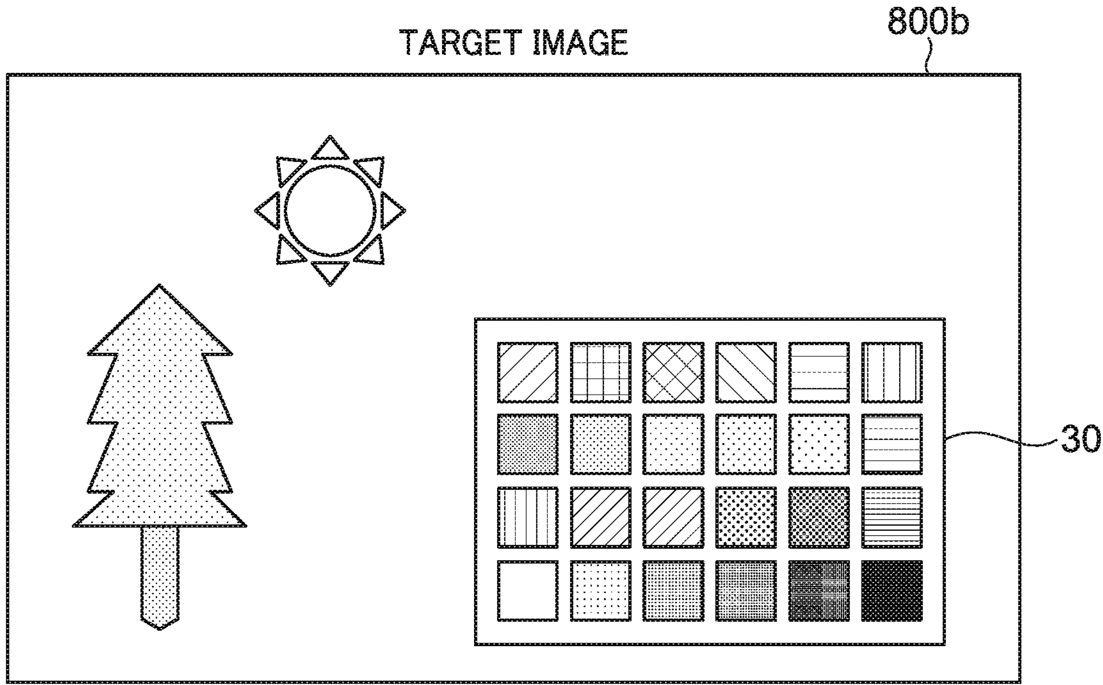

FIG. 8A shows a reference image 800*a* picked up by the reference camera 100. FIG. 8B shows a target image 800*b* picked up by the target camera 101. Each of the reference image 800*a* and the target image 800*b* includes the color chart 30.

As shown in FIG. 7, in a step S701, the patch pixel value extraction unit 205 receives the reference image, the target image, and the area information about the patches 31 to 54 in the respective images from the controller 203. Then, the patch pixel value extraction unit 205 extracts the first pixel values (see FIG. 4B) based on the target image and the area information about the patches 31 to 54 in the target image. The patch pixel value extraction unit 205 extracts the second pixel values (see FIG. 4A) based on the reference image and the area information about the patches 31 to 54 in the reference image. After the extraction, the patch pixel value extraction unit 205 transmits the first pixel values (RGB values) and the second pixel values (RGB values) to the dynamic range calculation unit 206.

In a step S702, the dynamic range calculation unit 206 receives the first pixel values and the second pixel values from the patch pixel value extraction unit 205. Then, the dynamic range calculation unit 206 calculates the first dynamic range based on the first pixel values. After the calculation, the dynamic range calculation unit 206 transmits the first dynamic range to the controller 203. As an example, the dynamic range of the color chart in the reference image is 4 to 144, and the dynamic range of the color chart in the target image is 4 to 160. In this embodiment, the dynamic range of the color chart in the target image is used as the first dynamic range. The dynamic range of the color chart in the reference image can also be used as the first dynamic range.

In a step S703, the controller 203 transmits the reference image, the target image, the area information about the patches 31 to 54 in the respective images, and the information about the first dynamic range to the singular point extraction unit 207. Thus, the singular point extraction unit 207 can receive these. Then, the singular point extraction unit 207 sets a predetermined pixel in an area excluding the area of the color chart 30 in the target image as a first singular point on the basis of the first dynamic range. The singular point extraction unit 207 extracts a pixel value of the first singular point as a first singular pixel value. Next, the singular point extraction unit 207 sets a second singular point in the reference image 800*a* on the basis of the first singular point. The singular point extraction unit 207 extracts a pixel value of the second singular point as a second singular pixel value.

After extracting the singular points, the singular point extraction unit 207 transmits the singular points to the controller 203. As described above, for example, the second singular point can be set as a point having the same coordinate as the first singular point under the condition where the reference image and the target image are superimposed on the common coordinate system. This extraction is enabled by, for example, displaying the first singular point in the target image 800*b* and the second singular point in the reference image 800*a* on the display unit 210 and the user selecting the first singular point and the second singular point in this order.

When the singular point in the reference image 800*a* is the first singular point and the singular point in the target image 800*b* is the second singular point, the user selects the singular point in the reference image 800*a* and the singular point in the target image 800*b* in this order. This selection order is reverse to the above-mentioned selection order. Alternatively, a technique such as pattern matching may be used to extract a singular point in one image based on the position of a singular point extracted from the other image.

Figure 9A:
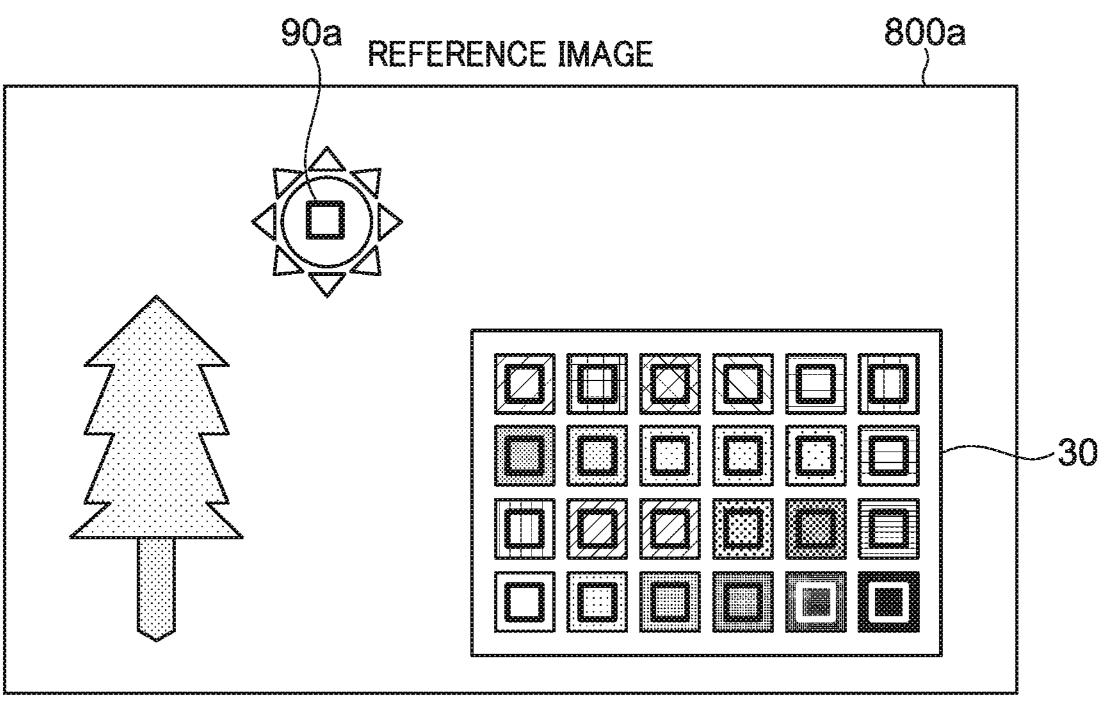
FIG. 9A and FIG. 9B are views respectively showing an example of a state in which a singular point in the reference image is extracted and an example of a state in which a singular point in the target image is extracted.
Figure 9B:
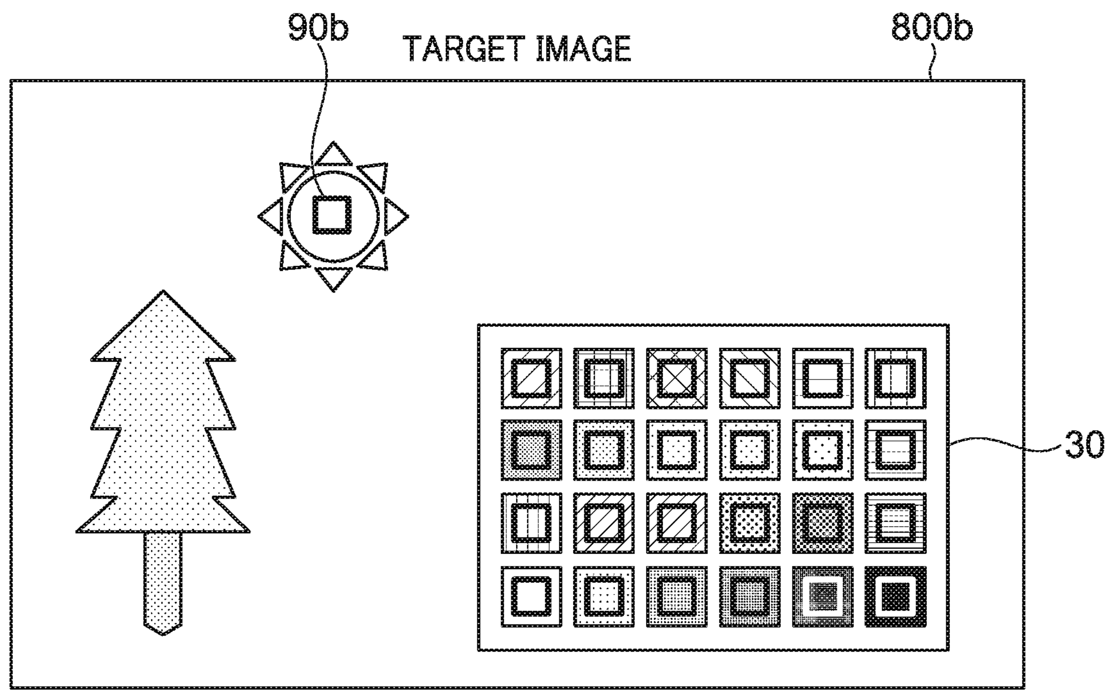

FIG. 9A and FIG. 9B are views respectively showing an example of a state in which a singular point in a reference image is extracted and an example of a state in which a singular point in a target image is extracted. A singular point 90*a* (a second singular point) in the reference image 800*a* and a singular point 90*b* (a first singular point) in the target image 800*b* both overlap the sun. The pixel value (RGB value) of the singular point 90*a* is (226, 226, 226). The pixel value (RGB value) of the singular point 90*b* is (241, 241, 241).

As described above, in this embodiment, the singular point extraction unit 207 is configured to be able to perform the setting operation of the singular point 90*a* and the setting operation of the singular point 90*b*. Thus, for example, the singular point 90*a* and the singular point 90*b* can be set to arbitrary points more suitable for the color matching. The singular point extraction unit 207 is configured to enable both the setting operation of the singular point 90*a* and the setting operation of the singular point 90*b*. However, this is not limiting. For example, the singular point extraction unit 207 may be configured to enable the setting operation of the singular point 90*a* only. In this case, the setting of the singular point 90*b* follows the setting of the singular point 90*a*.

In a step S704, the controller 203 transmits the first pixel values, the second pixel values, the first singular pixel value, and the second singular pixel value to the correction LUT generation unit 208. Thus, the correction LUT generation unit 208 can receive these pixel values. Then, the correction LUT generation unit 208 generates a correction LUT on the basis of the first pixel values, the second pixel values, the first singular pixel value, and the second singular pixel value. This generation uses the multidimensional function of the formula (1). The correction LUT generation unit 208 calculates the coefficients $a_0, a_1, \ldots a_{n-1}, a_n$ in the formula (1) from the first pixel values, the second pixel values, the first singular pixel value, and the second singular pixel value. The correction LUT generation unit 208 generates the correction LUT on the basis of a difference between an output value of the approximation formula for the reference image and an output value of the approximation formula for the target image.

The coefficients of the approximation formula for the reference image become values shown by the following equations (2).

$$a_0 = 0,\ a_1 = -0.04,\ a_2 = 16.18,\ a_3 = -0.17 \tag{2}$$

The coefficients of the approximation formula for the target image become values shown by the following equations (3).

$$a_0 = 0.06,\ a_1 = -1.69,\ a_2 = 28.01,\ a_3 = -13.35 \tag{3}$$

When the coefficients are calculated only from the pixel values of the patches without using the singular pixel value, the coefficients of the approximation formula for the reference image become values shown in the following equations (4) and the coefficients of the approximation formula for the target image become values shown in the following equations (5).

$$a_0 = 0,\ a_1 = 0,\ a_2 = 16,\ a_3 = 0 \tag{4}$$

$$a_0 = -0.12,\ a_1 = 1.61,\ a_2 = 12.59,\ a_3 = 1.71 \tag{5}$$

Figure 10:
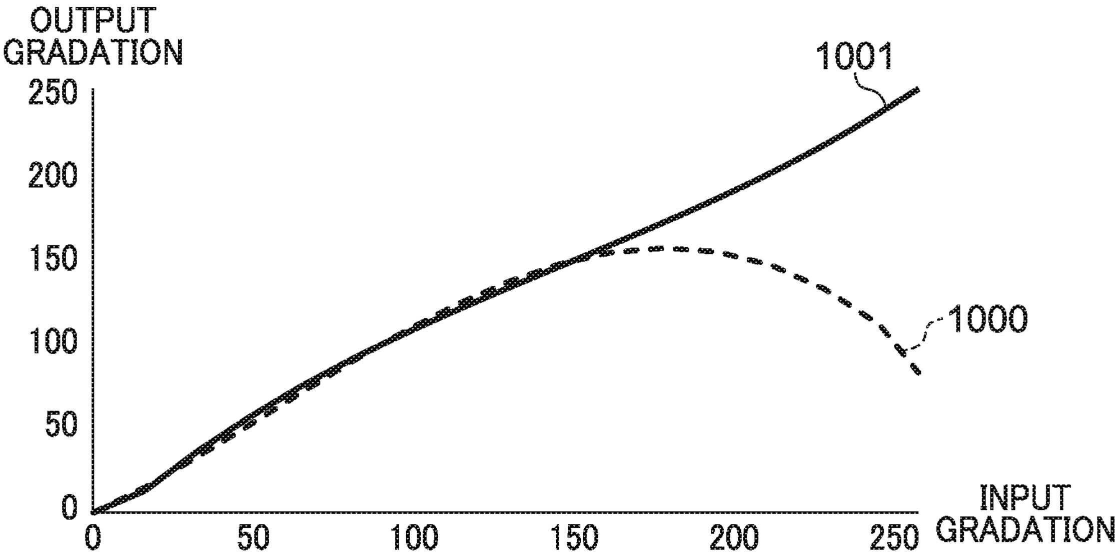
FIG. 10 is an image diagram comparing gray gradation data of correction LUTs in the first embodiment.

FIG. 10 is an image diagram comparing gray gradation data of correction LUTs. In FIG. 10, a correction LUT 1000 and a correction LUT 1001, each of which indicates a relationship between input gradation and output gradation, are drawn. The correction LUT 1000 is a comparative example generated using only the pixel values of the patches without using the singular pixel value, that is, generated according to the formula (1) and the equations (4) and (5). In the meantime, the corrected LUT 1001 is the embodiment generated by adding the singular pixel value, that is, generated according to the formula (1) and the equations (2) and (3). According to the correction LUT 1000, the output gradation decreases so as to draw an arc from the vicinity of the pixel value 160 that is outside the dynamic range of the color chart, and it is recognized that color curving occurs. According to the correction LUT 1001, it is recognized that the color curving outside the dynamic range of the color chart is reduced. In this way, the color matching control apparatus 200 can accurately perform the color matching between the images picked up by the image pickup apparatuses even in the color space outside the dynamic range of the color chart.

There may be two or more first singular points and second singular points. The set number of the first singular points can be appropriately set (determined) according to proportion of the first dynamic range to the entire gradations (255 in 8 bit) in the first image. The set number of the second singular points is equal to the set number of the first singular points. Thus, for example, when the first dynamic range is relatively narrow, a plurality of singular points are set outside the first dynamic range, thereby reducing the color curving. Further, for example, when the dynamic range is relatively wide so as to cover almost the entire gradations, the set number of the singular points can be reduced.

Figure 11A:
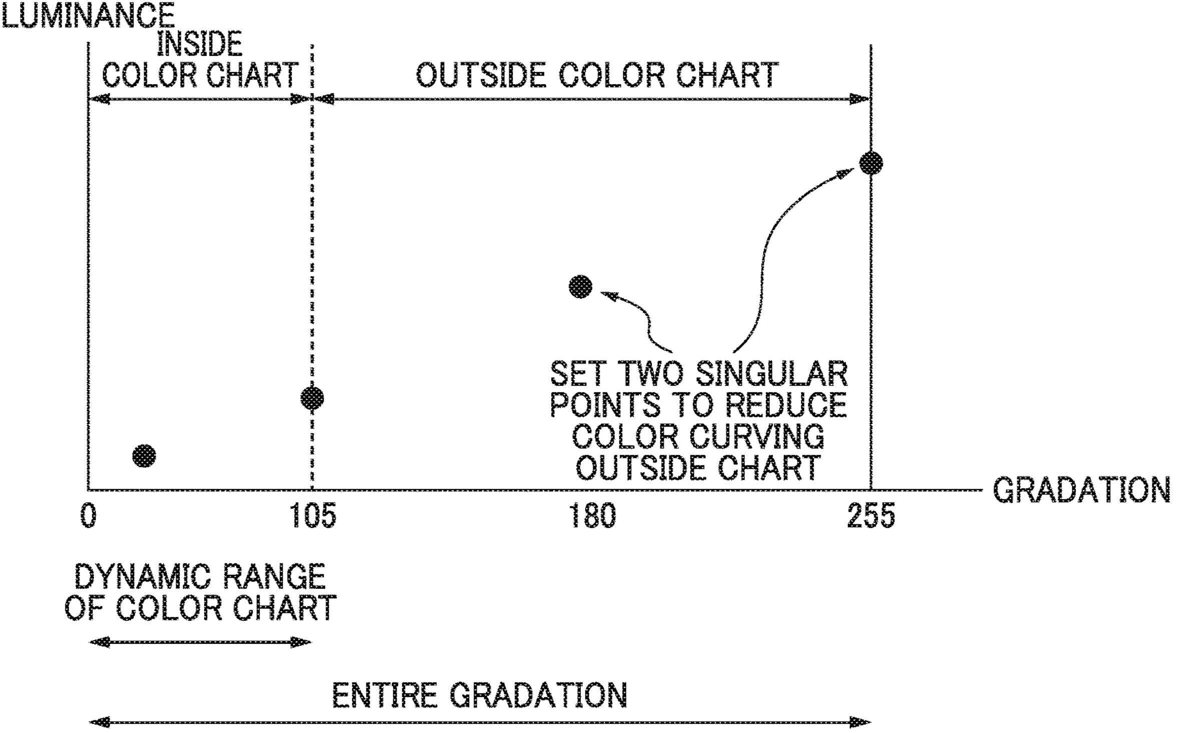
FIG. 11A and FIG. 11B are views respectively showing setting examples of singular points in the first embodiment.
Figure 11B:
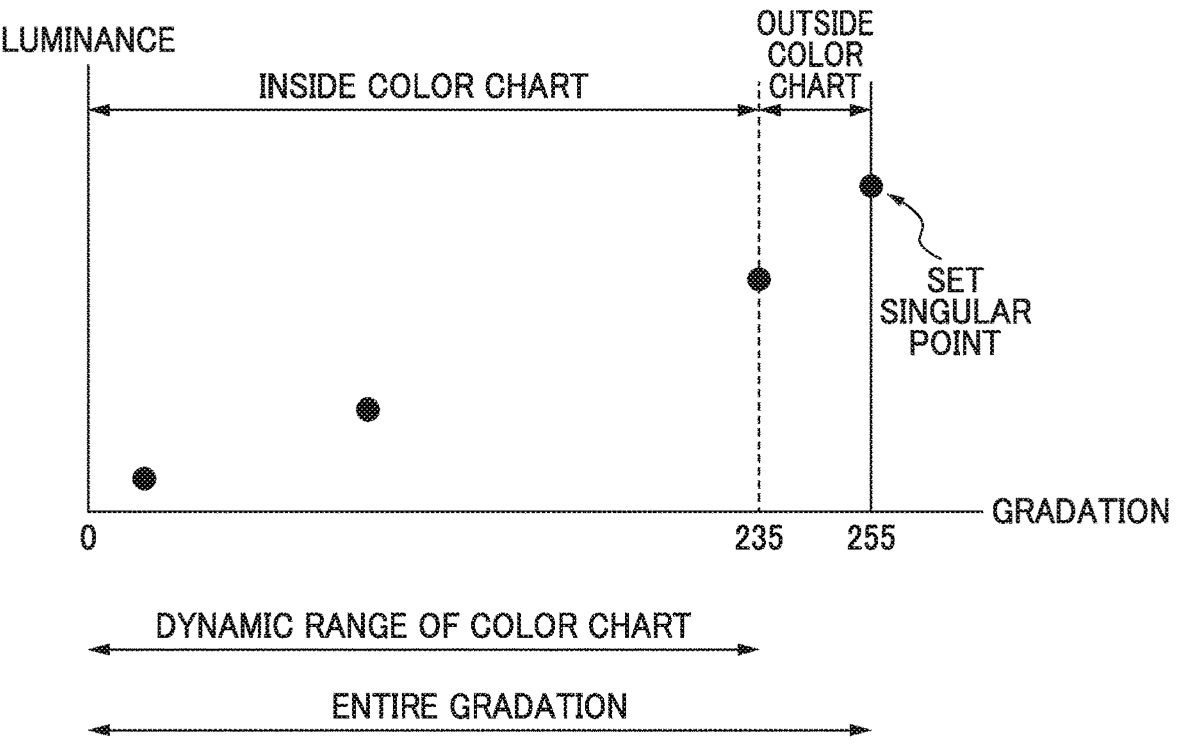

FIG. 11A and FIG. 11B are views respectively showing set examples of singular points. A horizontal axis represents gradation (an R component of a pixel) of a singular point to be set. A vertical axis represents a luminance value calculated by the gradation (RGB value) of the singular point. FIG. 11A shows an example in which a plurality of singular points are set when the proportion of the first dynamic range to the entire gradations in the image is small. FIG. 11B shows an example in which only a point having the maximum pixel value outside the first dynamic range is set as the singular point when the proportion of the first dynamic range to the entire gradations in the image is large.

In the example shown in FIG. 11A, the maximum value of the first dynamic range is 105. When two singular points (first singular points) are set, a point having the maximum pixel value (for example, a pixel value of 255) that is not included in the first dynamic range in the image is set as a singular point at the beginning. A next singular point is set at a point having an intermediate pixel value (for example, a pixel value 180) between the maximum value (the pixel value 105) of the dynamic range in the image and the pixel value (the pixel value 255) of the singular point set at the beginning.

In the example shown in FIG. 11B, the maximum value of the first dynamic range is 235. When one singular point (a first singular point) is set, a point having the maximum pixel value (for example, a pixel value 255) that is not included in the first dynamic range in the image is set as the singular point. In this way, the singular point can be set on the basis of a point at which a pixel value is the maximum in the area excluding the color chart area in the image. Further, the singular point is set to a point on the higher gradation side than the first dynamic range. Alternatively, the singular point may be set at a point at which a pixel value is minimum (minimum value) in the area excluding the color chart area in the image. In addition, when the first dynamic range is on the high gradation side, the singular point may be set on the lower gradation side than the first dynamic range.

The set number of the first singular points may be set according to the number of patches when the area of the color chart 30 included in the first image is divided into a plurality of patches. Thus, for example, when the number of patches is relatively small, the set number of first singular points can also be reduced. Also in this case, the set number of the second singular points is the same as the set number of the first singular points.

By setting the singular points as described above, it is possible to generate the correction LUT that reduces the color curving outside the first dynamic range while keeping the color accuracy of the color chart.

Hereafter, a second embodiment will be described with reference to FIG. 12 to FIG. 18B. Differences from the above-described embodiment will be mainly described, and the description of the same matters will be omitted. In this embodiment, a pixel value outside a dynamic range is estimated as a singular point and a correction LUT is generated using pixel values of the patches of the color chart and the estimated singular point. A case when color curving outside the dynamic range is reduced by the correction LUT will be described as an example.

FIG. 12 is a block diagram showing a hardware configuration of the color matching control apparatus according to the second embodiment. The color matching control apparatus 1200 of this embodiment is the same as that of the first embodiment except that a process in a controller 1201 and a process in a singular point extraction unit 1202 are different. The control unit 1201 switches (changes) parameters to be transmitted to the correction LUT generation unit 208 according to a type of the correction LUT generated by the correction LUT generation unit 208.

Specifically, when a correction LUT for singular point calculation (for singular point extraction) for calculating each singular point is generated, the controller 1201 transmits the first pixel values and the second pixel values received from the patch pixel value extraction unit 205 to the correction LUT generation unit 208. When generating a correction LUT to be applied to the target camera 101, the controller 1201 transmits the first pixel values and the second pixel values from the patch pixel value extraction unit 205 and the first singular pixel value and the second singular pixel value estimated by the singular point extraction unit 1202 to the correction LUT generation unit 208.

The controller 1201 transmits the information regarding the first dynamic range calculated by the dynamic range calculation unit 206 to the singular point extraction unit 1202. The singular point extraction unit 1202 estimates the pixel value outside the dynamic range as each singular point using the first dynamic range information received from the controller 1201 and the correction LUT for the singular point calculation generated by the correction LUT generation unit 208. The dynamic range information is not particularly limited, and for example, the maximum pixel value in the first dynamic range may be used.

Figure 13:
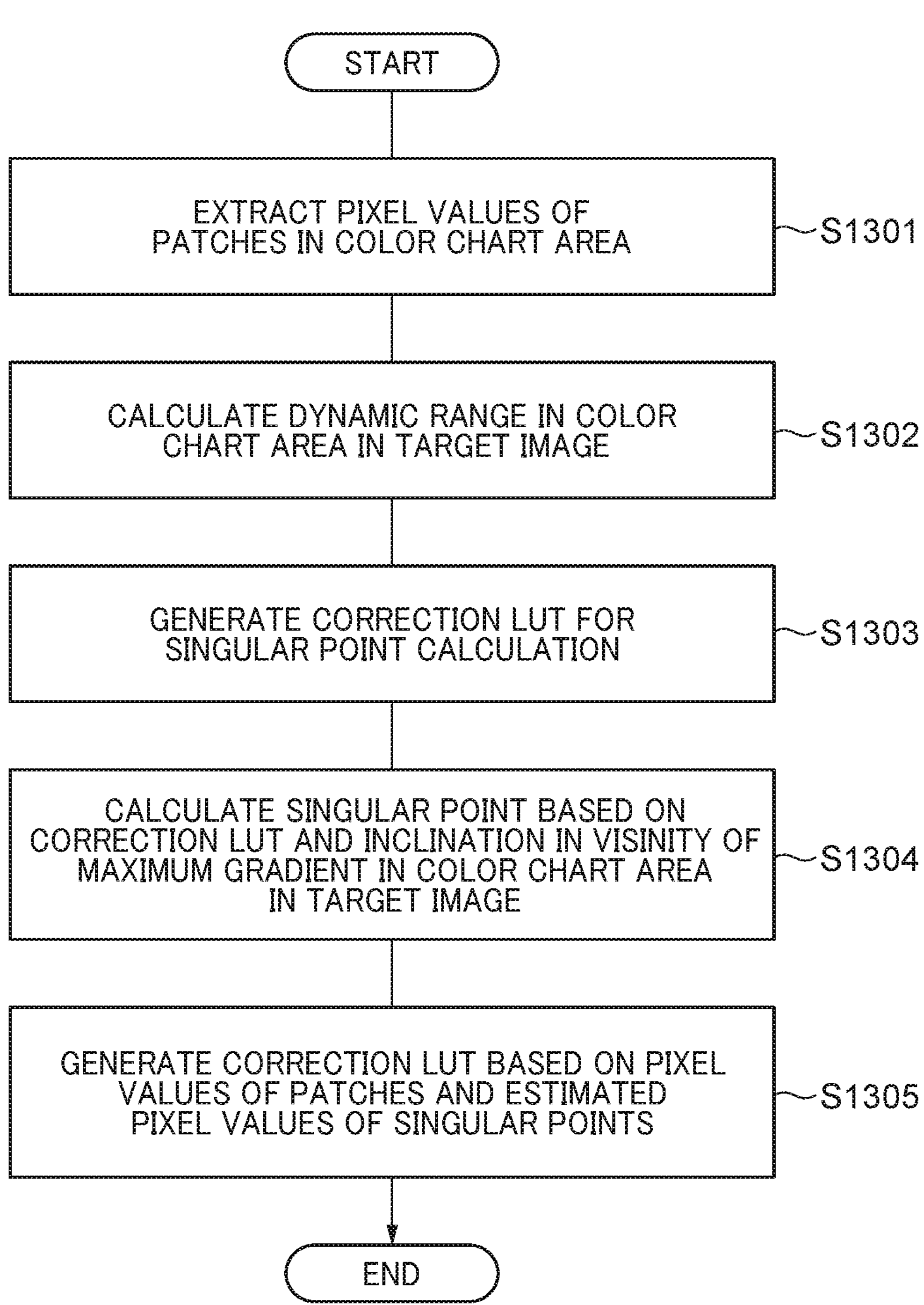
FIG. 13 is a flowchart showing a process for generating the correction LUT for color matching between a target camera and a reference camera in the color matching control apparatus according to the second embodiment.
Figure 14:
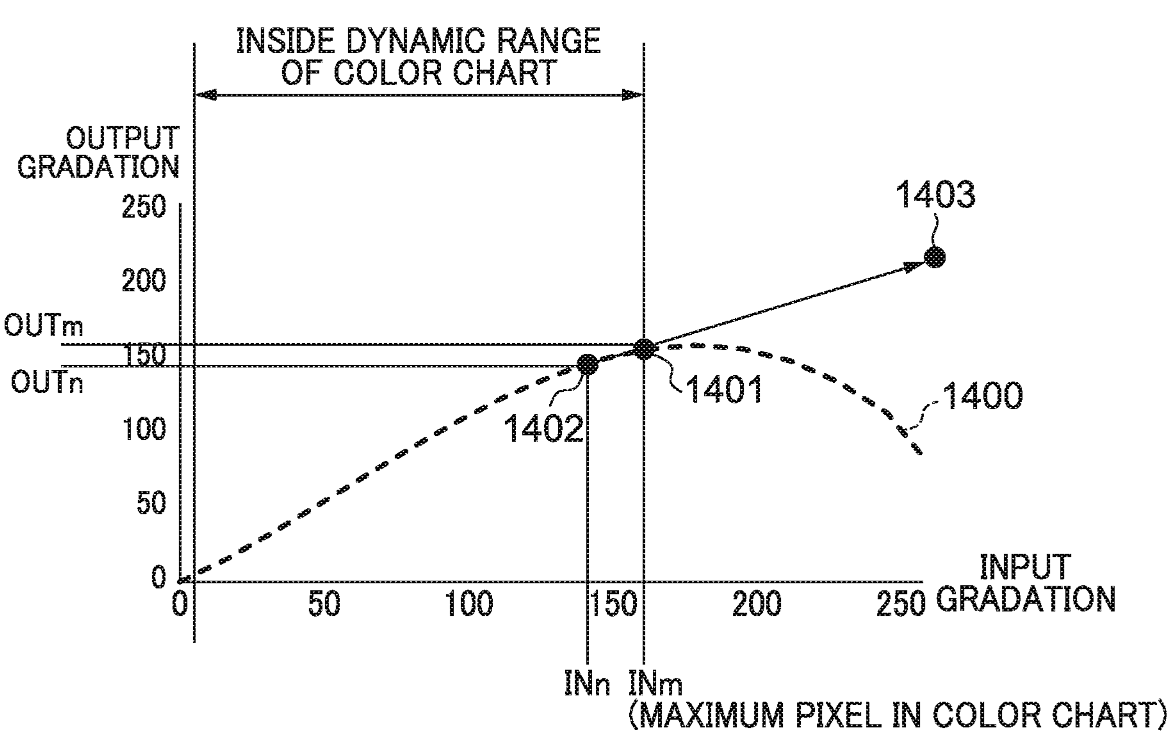
FIG. 14 is an image diagram showing gray gradation of a correction LUT in the second embodiment.

FIG. 13 is a flowchart showing a process for generating the correction LUT for the color matching between the target camera and the reference camera. FIG. 14 is an image diagram showing gray gradation data of the correction LUT. As shown in FIG. 13, in a step S1301, the patch pixel value extraction unit 205 receives the reference image, the target image, and the area information about the patches 31 to 54 in the respective images from the controller 203.

Then, the patch pixel value extraction unit 205 extracts the first pixel values on the basis of the target image and the area information about the patches 31 to 54 in the target image. The patch pixel value extraction unit 205 extracts the second pixel values on the basis of the reference image and the area information about the patches 31 to 54 in the reference image. After the extraction, the patch pixel value extraction unit 205 transmits the first pixel values and the second pixel values to the dynamic range calculation unit 206.

In a step S1302, the dynamic range calculation unit 206 receives the first pixel values and the second pixel values from the patch pixel value extraction unit 205. Then, the dynamic range calculation unit 206 calculates the dynamic range of the area of the color chart 30 included in the target image (first image), that is, the first dynamic range, on the basis of the first pixel values. After the calculation, the dynamic range calculation unit 206 transmits the first dynamic range to the controller 203. As an example, the dynamic range of the color chart in the reference image shall be 4 to 144, and the dynamic range of the color chart in the target image shall be 4 to 160 as with the first embodiment. In this embodiment, the dynamic range of the color chart in the target image is used as the first dynamic range as with the first embodiment.

In a step S1303, the controller 1201 receives the first pixel values and the second pixel values from the patch pixel value extraction unit 205. Then, the controller 1201 transmits the first pixel values and the second pixel values to the correction LUT generation unit 208 in order to generate the correction LUT for the singular point calculation. Thereafter, the correction LUT generation unit 208 receives the first pixel values and the second pixel values from the controller 1201. The correction LUT generation unit 208 sets the correction LUT generated using the approximation formula of the multidimensional function as described above as the correction LUT for the singular point calculation.

In a step S1304, the controller 1201 transmits the information regarding the first dynamic range to the singular point extraction unit 1202. Thereafter, the singular point extraction unit 1202 receives the information about the first dynamic range. As an example, the maximum pixel value of the first dynamic range of the target image is an RGB value (160, 160, 160). The singular point extraction unit 1202 estimates the first singular point on the basis of the correction LUT for the singular point calculation generated by the correction LUT generation unit 208 and the maximum pixel value of the first dynamic range received from the controller 1201.

A dashed line graph 1400 shown in FIG. 14 indicates the gray gradation of the correction LUT for the singular point calculation generated by the correction LUT generation unit 208 using only the pixel values of the patches, that is, generated according to the formula (1) and the equations (4) and (5). In the dashed line graph 1400, the output gradation decreases so as to draw an arc from the vicinity of the pixel value 150 that is outside the dynamic range, and it is recognized that color curving (color deviation) occurs. In order to reduce the color curving, a first singular point is set on the basis of the maximum pixel value of the first dynamic range.

Specifically, inclination in the vicinity of the maximum pixel value in the first dynamic range is calculated, and a pixel value outside the first dynamic range as a pixel value of a first singular point (a first singular pixel value) is estimated on the basis of the calculation result. The inclination can be calculated from, for example, two points 1401 and 1402. The point 1401 indicates an output value OUTm when the input value of the correction LUT for the singular point calculation is INm. The point 1402 indicates an output value OUTn when an input value is INn that is smaller than the input value INm. The inclination T can be calculated by the following formula (6).

$$T = (OUTm - OUTn)/(INm - INn) \tag{6}$$

The correction LUT for the singular point calculation is generated by adding the singular point, that is, generated on the basis of the formula (1) and the equations (2) and (3). Hereafter, a case when the output value for the input value 160 of the gray gradation is 157 and the output value for the input value 144 is 149 will be described as an example. When data other than the lattice points is used as the input value, the output data may be interpolated by using tetrahedron interpolation (triangular pyramid interpolation) etc. A primary straight line in the vicinity of the maximum pixel value in the first dynamic range can be expressed by the following formula (7).

$$OUTp = T * INp + 77 = ((157 - 149)/(160 - 144)) * INp + 77 = 0.5 * INp + 77 \tag{7}$$

Next, the singular point extraction unit 1202 calculates the singular point according to the formula (7). Here, a case when a point 1403 at which the input value INp is 240 and the output value OUTp is 197 is set as a singular point will be described as an example. The input value INp is a pixel value of the target image, and the output value OUTp is a correction value for adjusting the target image to the reference image, that is, a pixel value of the reference image corresponding to the target image. Therefore, the RGB value of the second singular point in the reference image with respect to the RGB value (240, 240, 240) of the first singular point in the target image is (197, 197, 197). The RGB value is transmitted to the control unit 1201. The input value INp is set to a value that does not exceed the maximum value of the entire gray gradations (for example, 255 in 8 bit). When the output value OUTp exceeds the maximum value of the entire gray gradations, the input value INp is rounded to the maximum value or set to a value so that the output value OUTp does not exceed the maximum value.

As described above, in this embodiment, the case when the maximum pixel value of the dynamic range is the gray gradation has been described as an example. In a case of mixed colors, a linear function is established using a G component of an RGB value, and the G component outside the color chart is estimated according to the linear function. Then, an R component and a B component are determined so as to keep the ratio between the RGB components on the basis of the G component.

As shown in FIG. 13, in a step S1305, the controller 1201 transmits the first pixel values, the first singular pixel value, the second pixel values, and the second singular pixel value to the correction LUT generation unit 208. Thus, the correction LUT generation unit 208 can receive these pixel values. Then, the correction LUT generation unit 208 performs the same process as that of the step S704 described above on the basis of the first pixel values, the second pixel values, the first singular pixel value, and the second singular pixel value, and generates a correction LUT to be applied to the target camera 101.

When the calculation is performed only from the pixel values of the patches without using a singular pixel value, the coefficients of the approximation formula for the reference image become values shown by the following equations (8) and the coefficients of the approximation formula for the target image become values shown by the following equations (9).

$$a_0 = 0.01,\ a_1 = -0.16,\ a_2 = 16.62,\ a_3 = -0.58 \tag{8}$$

$$a_0 = 0.06,\ a_1 = -1.67,\ a_2 = 27.92,\ a_3 = -13.25 \tag{9}$$

Figure 15:
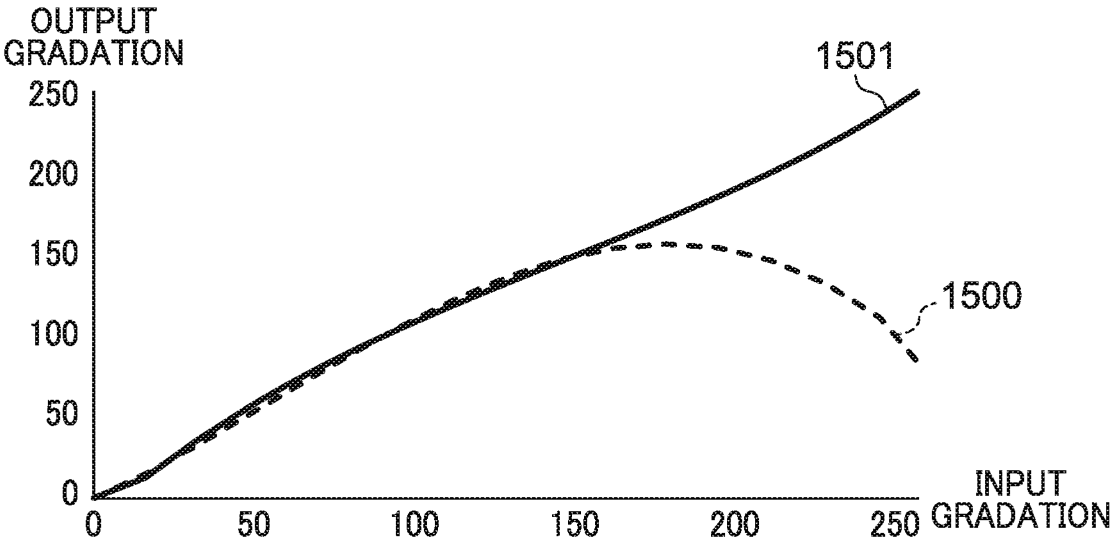
FIG. 15 is an image diagram comparing gray gradation data of correction LUTs in the second embodiment.

FIG. 15 is an image diagram comparing gray gradation data of correction LUTs. In FIG. 15, a correction LUT 1500 and a correction LUT 1501, each of which indicates a relationship between input gradation and output gradation, are drawn. The correction LUT 1500 is a comparative example generated using only the pixel values of the patches without using the singular pixel value, that is, generated on the basis of the formula (1) and the equations (8) and (9). In the meantime, the corrected LUT 1501 is the embodiment generated by adding the singular pixel value, that is, generated according to the formula (1) and the equations (2) and (3). According to the correction LUT 1500, the output gradation decreases so as to draw an arc from the vicinity of the pixel value 160 that is outside the dynamic range of the color chart, and it is recognized that color curving occurs. According to the correction LUT 1501, it is recognized that the color curving outside the dynamic range of the color chart is reduced. As described above, in this embodiment, it is possible to reduce color curving outside the dynamic range, that is, it is possible to accurately perform the color matching.

This embodiment may be combined with the first embodiment so as to use a singular point extracted from the image and an estimated singular point in the color matching, for example. For example, it is determined which of the maximum pixel value in the color chart and the pixel value of the estimated singular point is closer to the pixel value of the singular point extracted from the image. The determination method is not particularly limited. For example, a difference between the pixel value of the singular point extracted from the image and the maximum pixel value of the color chart is compared with a difference between the pixel value of the singular point extracted from the image and the pixel value of the estimated singular point, and the smaller difference is determined to be closer.

Then, as a result of the determination, when it is determined that the pixel value of the singular point extracted from the image is close to the maximum pixel value in the color chart, the singular point extracted from the image and the estimated singular point may be used. In the meantime, when it is determined that the pixel value of the singular point extracted from the image is close to the pixel value of the estimated singular point, only the singular point extracted from the image may be used. By using such a singular point, for example, even when the pixel value of the singular point extracted from the image is small because the dynamic range of the entire image is relatively narrow, a point of a pixel value on a higher gradation side can be estimated as the singular point. This makes it possible to reduce the color curving outside the dynamic range.

Figure 16A:
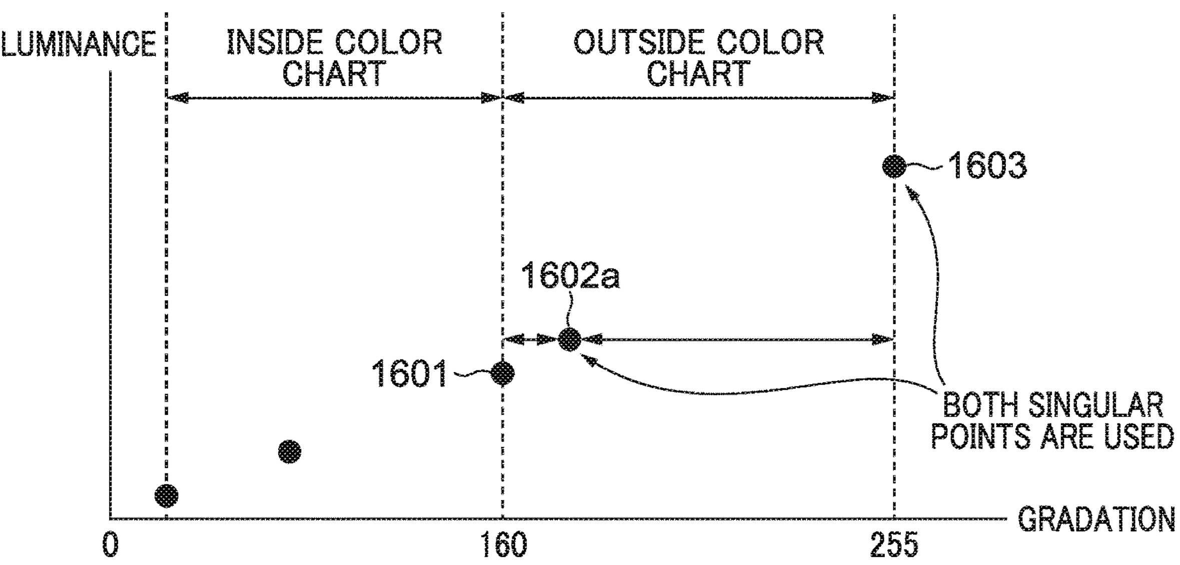
FIG. 16A and FIG. 16B are views respectively showing setting examples of singular points in the second embodiment.
Figure 16B:
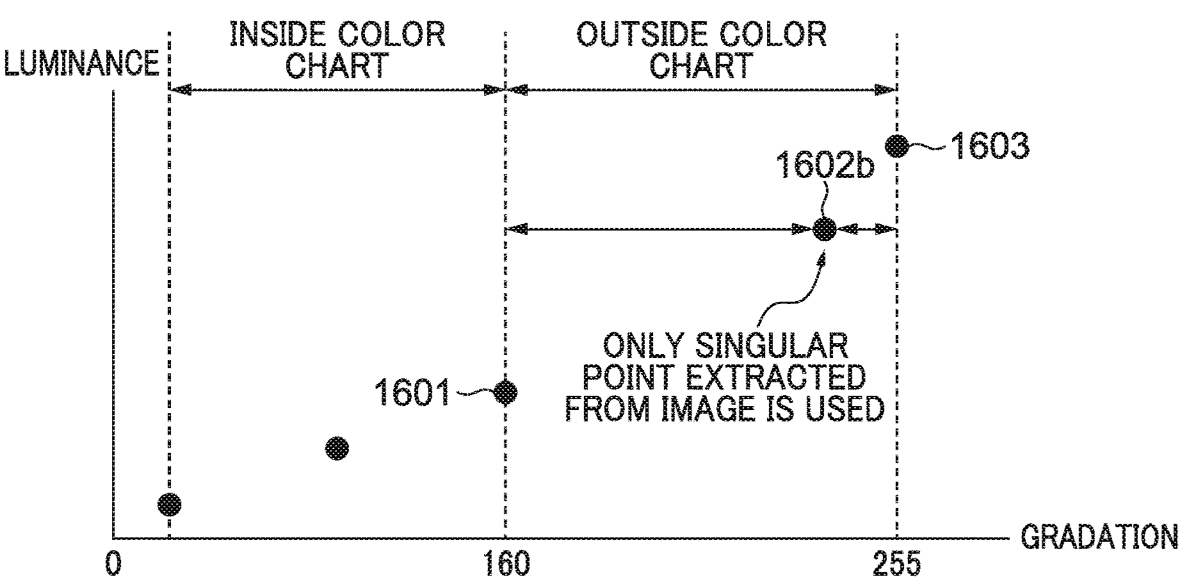

FIG. 16A and FIG. 16B are views showing examples of settings of the singular points. FIG. 16A is a view in a case when a singular point 1602*a* extracted from the image is closer to the maximum pixel value 1601 in the color chart than an estimated singular point 1603. FIG. 16B is a view in a case when a singular point 1602*b* extracted from the image is closer to the estimated singular point 1603 than the maximum pixel value 1601 in the color chart. When the singular point 1602*a* extracted from the image is closer to the maximum pixel value 1601 in the color chart than the estimated singular point 1603 as shown in FIG. 16A, the singular point 1602*a* and the singular point 1603 are preferably set as the first singular points. When the singular point 1602*b* extracted from the image is closer to the estimated singular point 1603 than the maximum pixel value 1601 in the color chart as shown in FIG. 16B, it is preferable to set only the singular point 1602*b* as the first singular point.

Figure 17:
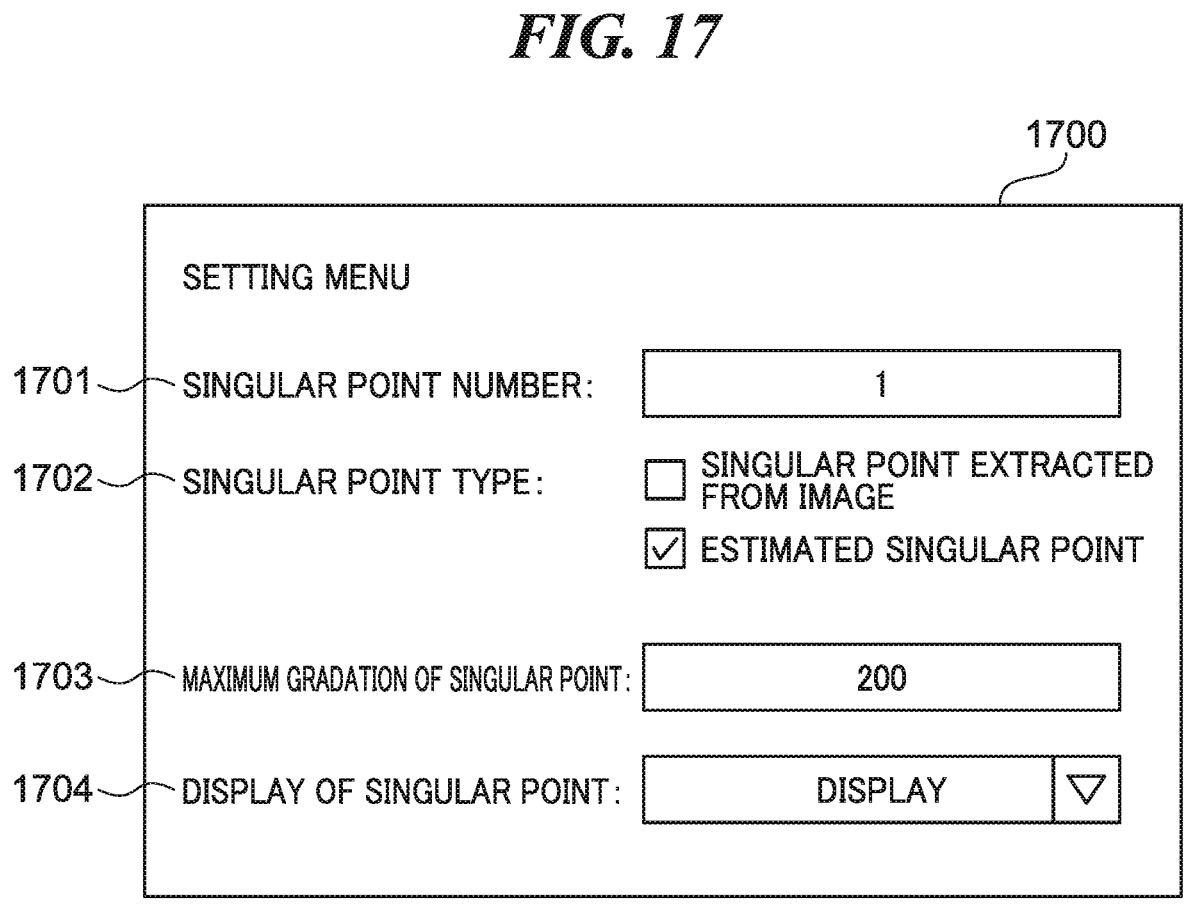
Figure 18A:
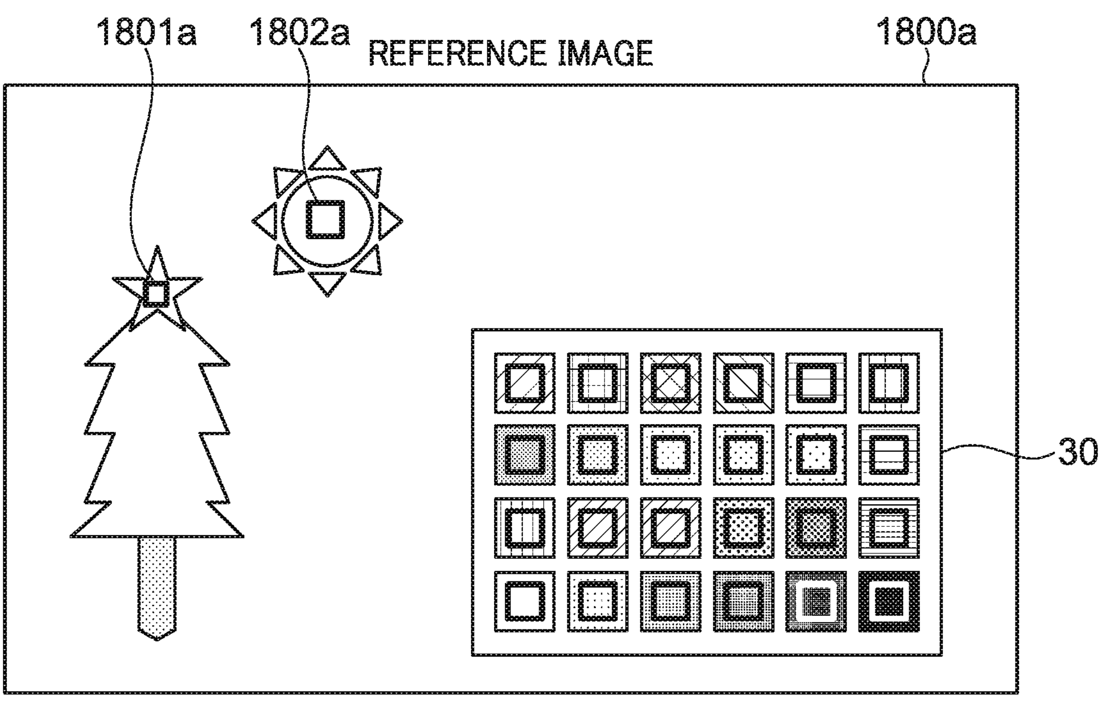
FIG. 18A and FIG. 18B are views showing display examples of singular points on images in the second embodiment.
Figure 18B:
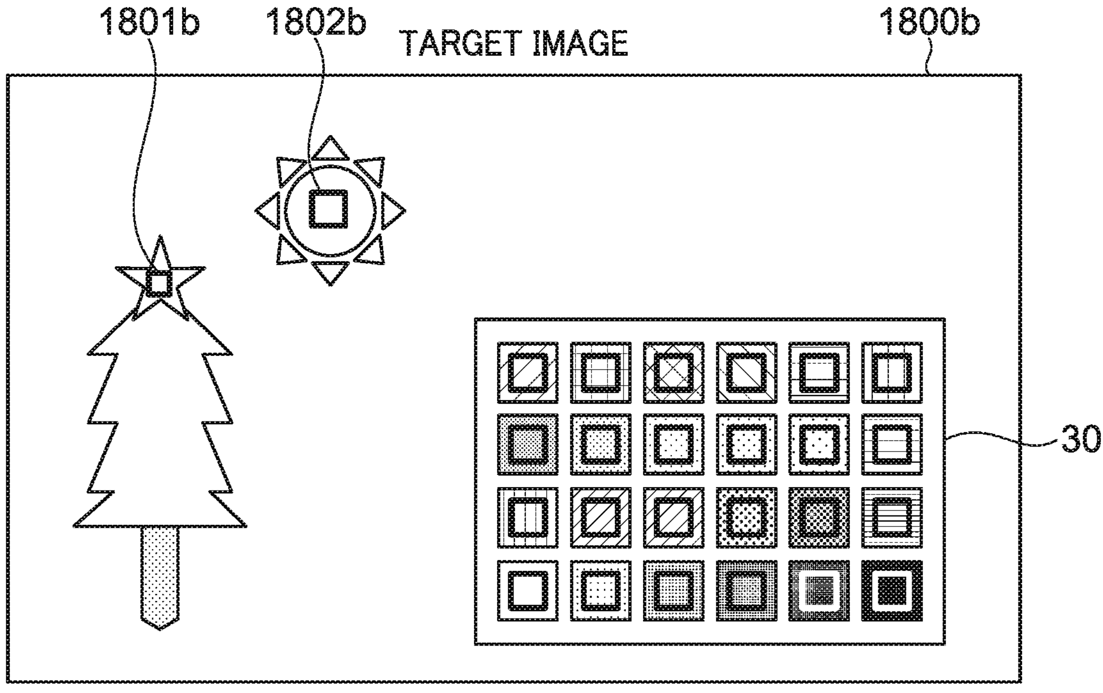

FIG. 17 is a view showing an example of a setting menu screen for setting a singular point. FIG. 18A and FIG. 18B are views showing display examples of the singular points on the image. FIG. 18A shows a reference image 1800*a* picked up by the reference camera 100. FIG. 18B shows a target image 1800*b* picked up by the target camera 101. The reference image 1800*a* and the target image 1800*b* include the color chart 30.

As shown in FIG. 17, the setting menu screen 1700 includes menus 1701, 1702, 1703, and 1704. In the menu 1701, the set number of first singular points (first singular points) is set. In the menu 1702, whether to use a singular point extracted from an image, to use an estimated singular point, or to use both of them is set as a type of a singular point. In the menu 1703, the maximum gradation value of the singular point (first singular point) is set. The user can easily set which singular point is used to generate a correction LUT by using the menus 1701 to 1703. Further, the user can set a singular point in consideration of the color accuracy in the color chart and the color accuracy outside the dynamic range.

In the menu 1704, the user can select whether to display a singular point on the image. The menu 1704 allows to display two first singular points (a first singular point 1801*b* and a first singular point 1802*b*) on the target image 1800*b* (see FIG. 18B). Thus, the user can easily know each first singular point. Further, two second singular points (a second singular point 1801*a* and a second singular point 1802*a*) corresponding to the first singular points are displayed on a reference image 1800*a* (see FIG. 18A). Thus, the user can easily know each second singular point. The color matching control apparatus 200 may be configured so that the user can select a singular point to be used from among these singular points. That is, the color matching control apparatus 200 may be configured to display a plurality of candidates for a first singular point on the screen or display a plurality of candidates for a second singular point on the screen. For example, when a plurality of candidates for a first singular point are displayed on the screen, the user can arbitrarily select a first singular point suitable for the color matching.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A color matching control apparatus comprising:

a memory device that stores a set of instructions; and at least one processor that executes the set of instructions:

to obtain a first image picked up by a first image pickup apparatus so as to include a color chart area;

to obtain a second image picked up by a second image pickup apparatus so as to include a color chart area;

to extract pixel values of the color chart area included in the first image as first pixel values;

to extract pixel values of the color chart area included in the second image as second pixel values;

to calculate a dynamic range of the color chart area included in the first image based on the first pixel values;

to set at least one predetermined pixel in an area excluding the color chart area in the first image as at least one first singular point based on the dynamic range;

to extract a pixel value of the at least one first singular point;

to set at least one second singular point in the second image based on the at least one first singular point;

to extract a pixel value of the at least one second singular point; and to generate a parameter for color matching between images picked up by the first and second image pickup apparatuses based on the first pixel values, the second pixel values, the pixel value of the at least one first singular point, and the pixel value of the at least one second singular point.

2. The color matching control apparatus according to claim 1, wherein the at least one first singular point is one of a point having a maximum pixel value and a point having a minimum pixel value in the area excluding the color chart area in the first image.

3. The color matching control apparatus according to claim 1, wherein the at least one second singular point is a point having a same coordinate as the at least one first singular point under a condition where the first image and the second image are superimposed on a common coordinate system.

4. The color matching control apparatus according to claim 1, wherein the pixel value of the at least one first singular point is outside the dynamic range.

5. The color matching control apparatus according to claim 1, wherein the at least one first singular point is set to at least one of a point on a higher gradation side than the dynamic range and a point on a lower gradation side than the dynamic range.

6. The color matching control apparatus according to claim 1, wherein the at least one first singular point is set based on a maximum pixel value of the dynamic range.

7. The color matching control apparatus according to claim 1, wherein the set number of the at least one first singular point is set according to proportion of the dynamic range to entire gradations in the first image, and wherein set number of the at least one second singular point is set to be equal to the set number of the at least one first singular point.

8. The color matching control apparatus of claim 1, wherein the at least one processor further executes the set of instructions in the memory device:

to extract pixel values of patches into which the color chart area in the first image is divided as the first pixel values; and to extract pixel values of patches into which the color chart area in the second image is divided as the second pixel values.

9. The color matching control apparatus according to claim 8, wherein the set number of the at least one first singular point is set according to the number of the patches into which the color chart area in the first image is divided, and wherein the set number of the at least one second singular point is equal to the set number of the at least one first singular point.

10. The color matching control apparatus according to claim 1, wherein at least one of an operation for setting the at least one first singular point and an operation for setting the set number of the at least one first singular point can be performed.

11. The color matching control apparatus according to claim 10, wherein the at least one processor further executes the set of instructions in the memory device to display a candidate of the at least one first singular point on a screen in performing at least one of the operation for setting the at least one first singular point and the operation for setting the set number of the at least one first singular point.

12. The color matching control apparatus according to claim 1, wherein at least one of an operation for setting the at least one second singular point and an operation for setting the set number of the at least one second singular point can be performed.

13. The color matching control apparatus according to claim 12, wherein the at least one processor further executes the set of instructions in the memory device to display a candidate of the at least one first singular point on a screen in performing at least one of the operation for setting the at least one second singular point and the operation for setting the set number of the at least one second singular point.

14. The color matching control apparatus according to claim 1, wherein the at least one processor further executes the set of instructions in the memory device to generate the parameter using an approximation formula of a multidimensional function.

15. The color matching control apparatus according to claim 1, wherein a look up table is generated as the parameter.

16. The color matching control apparatus according to claim 1, wherein the at least one processor further executes the set of instructions in the memory device to display the at least one first significant point in the first image and the at least one second significant point in the second image on a display unit.

17. A control method for a color matching control apparatus, the control method comprising:

obtaining a first image picked up by a first image pickup apparatus so as to include a color chart area;

obtaining a second image picked up by a second image pickup apparatus so as to include a color chart area;

extracting pixel values of the color chart area included in the first image as first pixel values;

extracting pixel values of the color chart area included in the second image as second pixel values;

calculating a dynamic range of the color chart area included in the first image based on the first pixel values;

setting at least one predetermined pixel in an area excluding the color chart area in the first image as at least one first singular point based on the dynamic range;

extracting a pixel value of the at least one first singular point;

setting at least one second singular point in the second image based on the at least one first singular point;

extracting a pixel value of the at least one second singular point; and generating a parameter for color matching between images picked up by the first and second image pickup apparatuses based on the first pixel values, the second pixel values, the pixel value of the at least one first singular point, and the pixel value of the at least one second singular point.

18. A non-transitory computer-readable storage medium storing a control program causing a computer to execute a control method for a color matching control apparatus, the control method comprising:

obtaining a first image picked up by a first image pickup apparatus so as to include a color chart area;

obtaining a second image picked up by a second image pickup apparatus so as to include a color chart area;

extracting pixel values of the color chart area included in the first image as first pixel values;

extracting pixel values of the color chart area included in the second image as second pixel values;

calculating a dynamic range of the color chart area included in the first image based on the first pixel values;

setting at least one predetermined pixel in an area excluding the color chart area in the first image as at least one first singular point based on the dynamic range;

extracting a pixel value of the at least one first singular point;

setting at least one second singular point in the second image based on the at least one first singular point;

extracting a pixel value of the at least one second singular point; and generating a parameter for color matching between images picked up by the first and second image pickup apparatuses based on the first pixel values, the second pixel values, the pixel value of the at least one first singular point, and the pixel value of the at least one second singular point.

* * * * *